US012718070B2

(12) United States Patent
Radovic et al.

(10) Patent No.: US 12,718,070 B2
(45) Date of Patent: Aug. 25, 2026

(54) SYSTEM AND METHOD FOR CONDITIONAL MARGINAL DISTRIBUTIONS AT FLEXIBLE EVALUATION HORIZONS

(71) Applicant: ROYAL BANK OF CANADA, Toronto (CA)

(72) Inventors: Alexander Radovic, Toronto (CA); Jiawei He, Vancouver (CA); Janahan Mathuran Ramanan, Toronto (CA); Marcus Anthony Brubaker, Toronto (CA); Andreas Steffen Michael Lehrmann, Vancouver (CA)

(73) Assignee: ROYAL BANK OF CANADA, Toronto (CA)

( * ) Notice: Subject to any disclaimer, the term of this patent is extended or adjusted under 35 U.S.C. 154(b) by 1132 days.

(21) Appl. No.: 17/750,335

(22) Filed: May 21, 2022

(65) Prior Publication Data

US 2022/0383075 A1 Dec. 1, 2022

Related U.S. Application Data

(60) Provisional application No. 63/195,639, filed on Jun. 1, 2021, provisional application No. 63/191,786, filed on May 21, 2021.

(51) Int. Cl.

| | |
|---|---|
| ***G06N 3/047*** | (2023.01) |
| ***B60W 50/00*** | (2006.01) |
| ***B60W 60/00*** | (2020.01) |
| ***G06N 3/08*** | (2023.01) |

(52) U.S. Cl.

CPC ......... *G06N 3/047* (2023.01); *B60W 50/0097* (2013.01); *B60W 60/0027* (2020.02); *G06N 3/08* (2013.01); *B60W 2554/4029* (2020.02); *B60W 2554/4041* (2020.02)

(58) Field of Classification Search

CPC ..... G06N 3/047; G06N 3/08; B60W 50/0097; B60W 60/0027; B60W 2554/4029; B60W 2554/4041

See application file for complete search history.

(56) References Cited

PUBLICATIONS

Chen, Ricky TQ, Yulia Rubanova, Jesse Bettencourt, and David K. Duvenaud. "Neural ordinary differential equations." Advances in neural information processing systems 31. (Year: 2019).*

Liang, Ming, Bin Yang, Wenyuan Zeng, Yun Chen, Rui Hu, Sergio Casas, and Raquel Urtasun. "Pnpnet: End-to-end perception and prediction with tracking in the loop." In Proceedings of the IEEE/CVF Conference on Computer Vision and Pattern Recognition, pp. 11553-11562. 2020. (Year: 2020).*

* cited by examiner

*Primary Examiner* — Kenneth M Lo

(74) *Attorney, Agent, or Firm* — NORTON ROSE FULBRIGHT CANADA LLP

(57) ABSTRACT

The methods and systems are directed to computational approaches for training and using machine learning algorithms to predict the conditional marginal distributions of the position of agents at flexible evaluation horizons and can enables more efficient path planning. These methods model agent movement by training a deep neural network to predict the position of an agent through time. A neural ordinary differential equation (neural ODE) that represents this neural network can be used to determine the log-likelihood of the agent's position as it moves in time.

20 Claims, 24 Drawing Sheets

600

800

900

| $n_m$ | | Prediction Horizon | | | | | | | | | | | | |
|---|---|---|---|---|---|---|---|---|---|---|---|---|---|---|
| | | 10* | 15 | 20* | 25 | 30 | 35 | 40* | 50* | 60* | 70* | 80 | 90 | 100 |
| 1 | ● | 1.588 | 2.159 | 2.399 | 2.713 | 2.938 | 3.117 | 3.335 | 3.656 | 3.942 | 4.195 | 4.441 | 4.78 | 5.426 |
| | ○ | 1.834 | 1.957 | 2.311 | 2.565 | 2.782 | 3.012 | 3.227 | 3.579 | 3.931 | 4.112 | 4.443 | 4.578 | 4.770 |
| 3 | ● | -0.006 | 0.344 | 0.676 | 0.974 | 1.188 | 1.379 | 1.580 | 1.930 | 2.181 | 2.435 | 2.677 | 2.942 | 3.1551 |
| | ○ | 0.719 | 0.649 | 0.779 | 0.994 | 1.248 | 1.476 | 1.641 | 1.956 | 2.239 | 2.39 | 2.670 | 2.915 | 3.231 |
| 8 | ● | 1.092 | 1.516 | 1.805 | 2.153 | 2.380 | 2.572 | 2.788 | 3.064 | 3.321 | 3.558 | 3.803 | 4.150 | 4.601 |
| | ○ | 1.681 | 1.726 | 1.91 | 2.133 | 2.368 | 2.562 | 2.71 | 3.082 | 3.348 | 3.662 | 3.842 | 4.092 | 4.329 |

| Model | AAF [44] | NAF [35] | HCNAF [17] | OMEN |
|---|---|---|---|---|
| 2 by 2 | 6.056 | 3.775 | 3.896 | 3.896 |
| 5 by 5 | 5.289 | 3.865 | 3.966 | 3.975 |
| 10 by 10 | 5.087 | 4.176 | 4.278 | 4.336 |

| Method | Test $\hat{e}$ |
|---|---|
| PRECOG-ESP [12] | $0.634 \pm 0.006$ |
| HCNAF [17] | $0.114$ |
| CTFP* [18] | $0.500 \pm 0.014$ |
| OMEN* | $0.185 \pm 0.002$ |
| OMEN-discrete | $0.144 \pm 0.006$ |
| OMEN-nocon* | $0.791 \pm 0.010$ |

Start

Initialize Neural ODE adapted for predicting an evolution of a probability distribution
1602

Obtain positional data sets and/or available conditioning information (e.g., environmental data or data relating to other agents)
1604

Train the Neural ODE by minimizing a target loss function (e.g., mean negative log-likelihood at N target horizons from M agents)
1606

Identify time points of interest for inference (e.g., extrapolated points or interpolated points)
1608

Generate predictions by determining likelihood estimates at corresponding horizons of interest to determine corresponding points in the base distribution $z_0$
1610

At inference, sample, from the base distribution to find $z^0$, and along with the conditional information, utilize the trained Neural ODE to solve for the time points of interest to generate output data structure
1612

Communicate output data structure indicative of predicted positions to downstream computing systems
1614

End

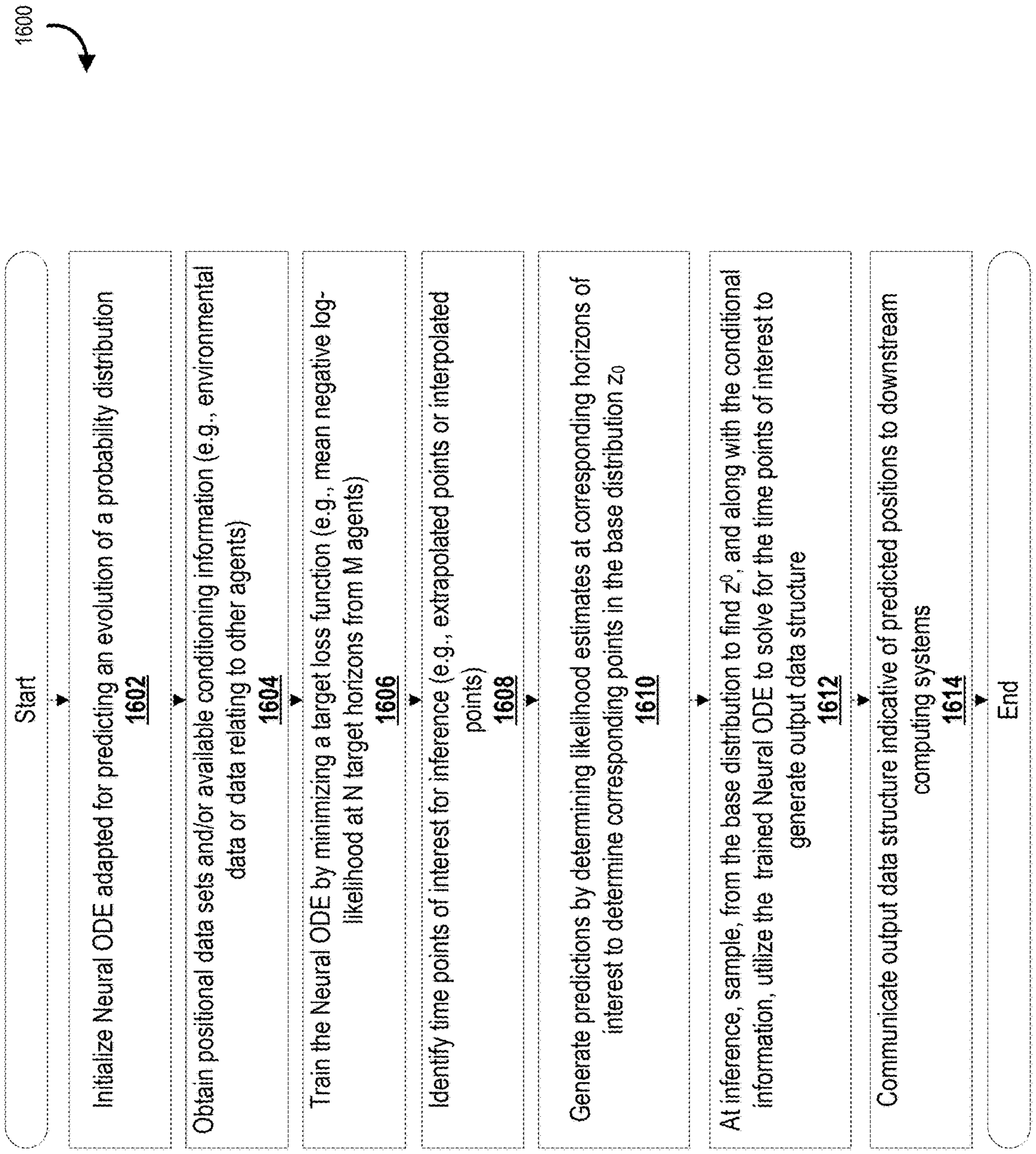

FIG. 16

SYSTEM AND METHOD FOR CONDITIONAL MARGINAL DISTRIBUTIONS AT FLEXIBLE EVALUATION HORIZONS

CROSS-REFERENCE

This application is a non-provisional of, and claims all benefit, including priority to, U.S. Application No. 63/195,639 dated 2021 Jun. 1, and U.S. Application No. 63/191,786 dated 2021 May 21, both applications entitled SYSTEM AND METHOD FOR CONDITIONAL MARGINAL DISTRIBUTIONS AT FLEXIBLE EVALUATION HORIZONS, both incorporated herein by reference in their entireties.

FIELD

Embodiments of the present disclosure relate to the field of machine learning, and more specifically, embodiments relate to devices, systems and methods for improved prediction of conditional marginal distributions at flexible evaluation horizons.

INTRODUCTION

Certain machine learning tasks (e.g., autonomous vehicles) require the prediction of future positions of agents. These positions may be virtual or physical positions. Despite the importance of the position prediction problem, the performance on this task is far from satisfactory. In particular, conventional machine learning position prediction can be confined to predicting positions at regular intervals in time. It is desirable that machine learning systems be able to predict the position of an agent in a continuous manner.

SUMMARY

Machine learning tasks, in some instances, require the prediction of future positions of agents. Agents can include other data processes that control operation of other computing devices or data objects operating in a same space. In a practical non-limiting example relating to autonomous vehicles, it is desirable that the vehicle is able to detect the current position of agents in its environment, such as pedestrians and other vehicles. Beyond this, the autonomous vehicle also needs a reliable mechanism for attempting to predict the movement of these agents in its environment to plan its own movement in a safe and efficient manner.

Despite the importance of the position prediction problem, computational performance on this task is far from satisfactory. In particular, reference approaches for machine learning position prediction can be confined to predicting positions at regular intervals in time.

Described herein is, according to some embodiments, a neural ODE based normalizing flow for the prediction of marginal distributions at flexible evaluation horizons, which may be applied to agent position forecasting. The described architecture according to some embodiments, provides a computational mechanism that embeds an assumption that marginal distributions of a given agent moving forward in time are related, allowing for an efficient representation of marginal distributions through time and allowing for reliable interpolation between prediction horizons seen in training. Experiments on a popular agent forecasting dataset are described, and demonstrate improvements over most baseline approaches, and comparable performance to the state of the art (SOTA) while providing new functionality of reliable interpolation of predicted marginal distributions between prediction horizons, demonstrated herein with synthetic data. A computer implemented approach is proposed that can be practically implemented on computing software and hardware, used, for example, to generate predictions relating to future or interpolated positions that can be used, among others, autonomous driving. An example output is a set of data points representing different positions and an associated probability of whether the agent will be in that position at a particular time. Another example output is the trained ODE itself that can be used to generate the predictive outputs.

As described herein in a proposed approach, it is preferable that systems used for certain prediction tasks be able to predict the position of agents in the environment on flexible evaluation horizons. Reference machine learning approaches use fixed evaluation points that make the system blind to agent positions at time points between the fixed evaluation points. The methods and systems presented herein present a computer-based mechanism of training and using machine learning approaches to predict the conditional marginal distributions of the position of agents at flexible evaluation horizons and can enables more efficient path planning (e.g., for autonomous vehicles). A number of variant embodiments are also described.

These methods model agent movement by training a deep neural network to predict the position of an agent through time. A neural ordinary differential equation (neural ODE) that represents this neural network can be used to determine the log-likelihood of the agent's position as it moves in time.

Embodiments described herein also introduce adding a warm-up time between base distribution and the evaluation points, in a variation. A base distribution and the first evaluation point can be arbitrarily distinct and the capacity required to transform the base distribution into a first evaluation point can be greater than the capacity required to transform the distribution between subsequent evaluation points. The warm-up period dedicates more of the neural network's capacity to the initial transformation between the base distribution and the first evaluation point.

In some aspects, the systems described herein are adapted for training and using an agent forecasting neural network to predict a future position probability of at least one agent, the system including a computing device including at least one processor. The system could be, for example, a computer server, or in some embodiments, implemented on a distributed set of computing resources.

The computing device is configured to receive a dataset comprising at least one observation corresponding to a position of the at least one agent at or prior to an inference time, encode the dataset, initialize the agent forecasting neural network using the encoded dataset and an observation corresponding to a position of the at least one agent at a horizon time, wherein the horizon time is after the inference time, determine a neural ordinary differential equation (ODE) that describes a bijective transformation from a base distribution to the observation corresponding to a position of the at least one agent at the horizon time given the encoded dataset using the agent forecasting neural network.

The neural ODE can be configured with, in some embodiments, a warm-up time that dedicates capacity of the agent forecasting neural network to the transformation between the base distribution and a first evaluation point.

The computing device is configured to further adjust trainable parameters of the agent forecasting neural network to minimize a loss function based on the observation corresponding to a position of the at least one agent at a horizon time, and to predict a future position probability of at least one agent by encoding a new input dataset and processing the encoded new input dataset in the trained agent forecasting neural network according to its training.

In some aspects, a method described herein includes training and using an agent forecasting neural network to predict a future position probability of at least one agent. The method comprising receiving a dataset comprising at least one observation corresponding to a position of the at least one agent at or prior to an inference time, encoding the dataset, initializing the agent forecasting neural network using the encoded dataset and an observation corresponding to a position of the at least one agent at a horizon time, wherein the horizon time is after the inference time, determining a neural ordinary differential equation (ODE) that describes a transformation from a base distribution to the observation corresponding to a position of the at least one agent at the horizon time given the encoded dataset using the agent forecasting neural network (in some embodiments, the neural ODE has a warm-up time that dedicates capacity of the agent forecasting neural network to the transformation between the base distribution and a first evaluation point), adjusting trainable parameters of the agent forecasting neural network to minimize a loss function based on the observation corresponding to a position of the at least one agent at a horizon time, predicting a future position probability of at least one agent by encoding a new input dataset and processing the encoded new input dataset in the trained agent forecasting neural network according to its training.

In some embodiments, the dataset can include at least one observation corresponding to an environment at or prior to an inference time.

In some embodiments, the trainable parameters include the warm-up time.

In some embodiments, the transformation from a base distribution to the observation corresponding to a position of the at least one agent at the horizon time includes a transformation towards one or more observations corresponding to one or more positions of the at least one agent at one or more additional times, wherein the additional times are after the inference time and before the horizon time, and the loss function is further based on the one or more observations corresponding to the one or more positions of the at least one agent at the one or more additional times.

In some embodiments, the at least one observation corresponding to the position of the at least one agent at or prior to the inference time includes at least one observation corresponding to a physical position of the at least one agent at or prior to the inference time, the one observation corresponding to a position of the at least one agent at the horizon time includes one observation corresponding to a physical position of the at least one agent at the horizon time, and the future position probability of the at least one agent comprises a future physical position probability of the at least one agent.

In some embodiments, an encoding neural network encodes the dataset and the computing device is further configured to adjust trainable parameters of the encoding neural network to minimize a loss function based on the observation corresponding to a position of the at least one agent at a horizon time.

In some embodiments, the new input dataset is provided by at least one position detector configured to provide new input observations corresponding to a position of at least one agent at an observation time.

In some embodiments, the new input dataset includes at least one observation corresponding to an environment at or prior to an inference time provided by at least one environmental detector.

In some embodiments, the at least one agent can be at least one vehicle or pedestrian, the new input observations corresponding to a position of at least one agent at an observation time includes new input observations corresponding to a physical position of the at least one vehicle or pedestrian at an observation time, and the computing device is further configured to direct the movement of a vehicle based in part on a predicted position of the at least one vehicle or pedestrian.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 9 illustrates performance (NLL score) on target horizons, according to some embodiments.

FIG. 10 illustrates the NLL for the synthetic Gaussian experiments, according to some embodiments.

FIG. 11 illustrates PRECOG-Carla single agent forecasting evaluation, according to some embodiments.

FIG. 16 is a method diagram showing an example approach for generating agent position predictions at flexible prediction horizons, according to some embodiments.

DETAILED DESCRIPTION

Figure 1:
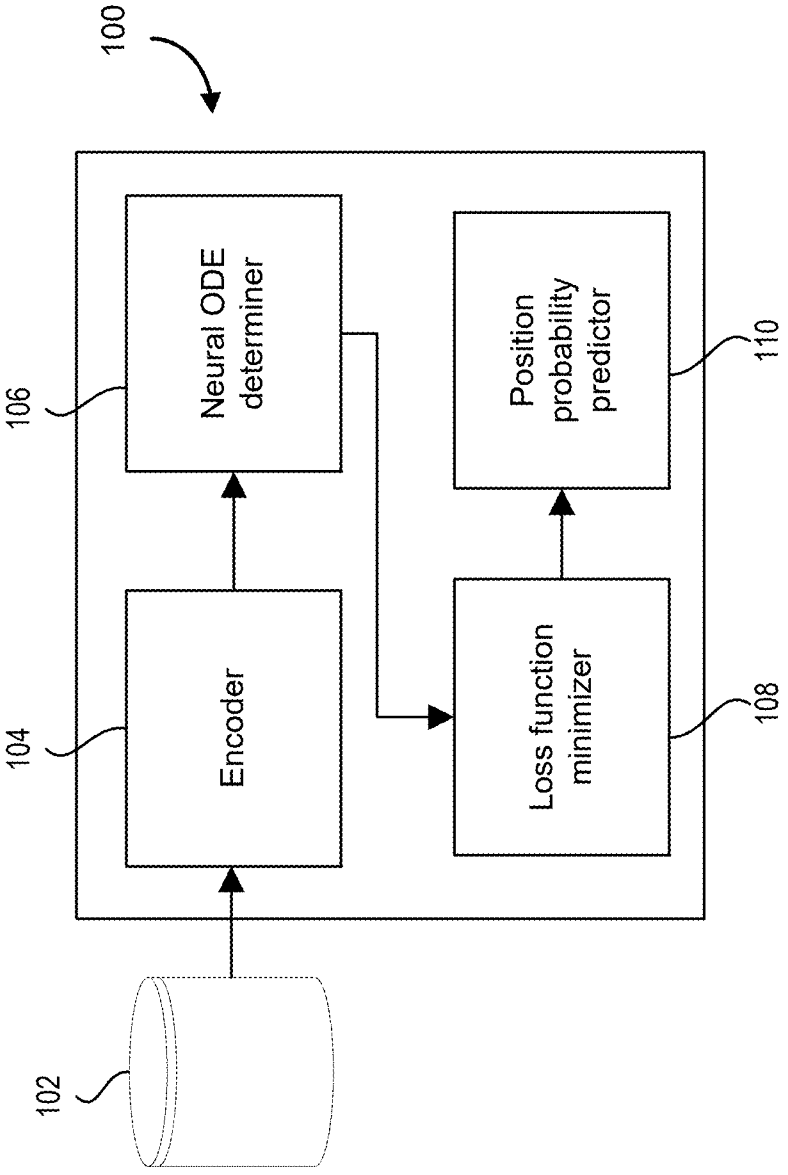
FIG. 1 illustrates a learning system for configuring a neural network to predict marginal distributions of agent positions at flexible time horizons, according to some embodiments.

Some machine learning tasks require the prediction of future positions of agents. In autonomous vehicles, it is desirable that the vehicle is able to detect the current position of agents in its environment such as pedestrians and other vehicles. Beyond this, the autonomous vehicle also needs a reliable means of predicting the movement of these agents in its environment to plan its own movement in a safe and efficient manner.

Other example applications include activities where positions or proxies for positions can be established. In these situations, data is only available at irregular time points which a system may not have initially been trained on. As such it is important to be able to model in a continuous manner.

Despite the importance of the position prediction problem, the performance on this task is far from satisfactory. In particular, reference machine learning position prediction can be confined to predicting positions at regular intervals in time. It is preferable that systems used for certain prediction tasks be able to predict the position of agents in the environment on flexible evaluation horizons. Reference machine learning approaches use fixed evaluation points that can make the system blind to agent positions at time points between the fixed evaluation points.

The methods and systems presented herein present an approach for training and using machine learning approaches to predict conditional marginal distributions of the position of an agents at flexible evaluation times which enables more efficient planning (e.g., for autonomous vehicles). These methods model agent movement by training a deep neural network to predict the position of an agent through time. A neural ordinary differential equation (neural ODE) that represents this neural network can be used to determine the log-likelihood of the agent's position as it moves in time.

Embodiments described herein also introduce adding in a warm-up time between base distribution and the evaluation points. The distribution of the base distribution and the first evaluation point can be arbitrarily distinct and the capacity required to transform the base distribution into the evaluation at the first evaluation point to be larger than the capacity required to transform the distribution between subsequent evaluation points. The warm-up period dedicates more of the neural network's capacity to the initial transformation between the base distribution and the first evaluation point.

The approach can be practically implemented in the form of a computer server configured to automatically generate output data structures based at least on conditional marginal distributions at flexible evaluation horizons. As an example sample output, the output data structures in an embodiment are data objects having data fields and/or data elements that represent a predicted occupancy map or occupancy distribution, such as a set of values overlaid onto a grid, indicative of potential positions of other independent agents at various points in time.

The output data structures can then be processed by downstream systems or using a machine learning model to modify the behaviour of an agent. This is particularly useful in applications where the positions of other agents will directly impact decision points in the present or near future. For example, the system can be configured to receive data sets relating to autonomous vehicle (e.g., car, drone) positions and/or physical object positions (e.g., pedestrians, bikers), and model these as external agents.

The occupancy map or distribution can then be utilized in an attempt to avoid a potential collision or dangerous situation.

Described herein are systems and methods, which may be referred to as "OMEN". OMEN is a neural ODE based normalizing flow for the prediction of marginal distributions at flexible evaluation horizons, and OMEN may be applied to agent position forecasting. OMEN's architecture, according to some embodiments, embeds an assumption that marginal distributions of a given agent moving forward in time are related, allowing for an efficient representation of marginal distributions through time and allowing for reliable interpolation between prediction horizons seen in training.

Experiments on a popular agent forecasting dataset demonstrate significant improvements over most baseline approaches, and comparable performance to the current approaches while providing new functionality of reliable interpolation of predicted marginal distributions between prediction horizons as demonstrated with synthetic data.

FIG. 1 illustrates a learning system for teaching a neural network to predict marginal distributions of agent positions at flexible time horizons, according to some embodiments.

The learning system 100 can include a specific machine learning training data process or can be implemented as a machine learning training mechanism, such as a physical computing server or a set of computers. The learning system 100 can be used to train a neural network to predict the conditional marginal distributions at flexible evaluation horizons for application in agent forecasting. The learning system 100 is a set of computing devices that are adapted for conducting machine learning training of the neural network.

Learning system 100 includes a dataset on memory store 102, an encoder 104, a neural ODE determiner 106, a loss function minimizer 108, and a position probability predictor 110. Each of these components are implemented using physical computing hardware, software, and/or embedded firmware, and the system 100, for example, could be a special purpose machine that is coupled to a computing infrastructure, such as a data center that receives data sets and generates output data structures for downstream processing by other computing devices.

Learning system 100 can receive dataset from a memory store 102. Learning system 100 can alternatively receive a dataset from detectors receiving data in real-time (not shown). The datasets can for example be in the form of vector representations of the historical location of agents in the environment. In some embodiments, the data can include LIDAR and visual information in a stack of visual information and a 2-D LIDAR map. The learning system 100 receives the dataset. The dataset includes observations of the positon of an agent at various time points. The dataset can also include additional environmental information (e.g., periodic LIDAR and video observations about an environment, headline searches, etc.) which the system can use to predict a future position of an agent.

Encoder 104 encodes the dataset for processing by an agent forecasting neural network. Encoder 104 can use an encoder neural network to encode the dataset. Encoder 104 can transform the data into a vector that will be used to predict the conditional marginal distributions at flexible evaluation horizons. A neural network can be trained to focus the system to information that is more relevant to predicting the position Neural ODE determiner 106 uses the position of the agent at the horizon time (i.e., the last observed position in the dataset), a base distribution, and observations of the agent and/or the environment before the inference time to have an agent forecasting neural network approximate the continuous transformation between the base distribution and the position at the horizon time. Neural ODE determiner 106 then determines the neural ODE that describes the transformation generated by the agent forecasting neural network. Learning system 100 can then solve the neural ODE to calculate the log-likelihood of the position of the agent through time. This allows the system to determine the points in the horizon distribution in the base distribution and to solve the log determinant of that transform.

In some embodiments, the agent forecasting neural network can implement a warm-up time between the base distribution and the first evaluated point. This transformation is likely to be the most significant transformation as the base distribution can be arbitrarily distinct from the first evaluation point. The warm-up time allows the agent forecasting neural network to dedicate more capacity to this transformation.

Loss function minimizer 108 determines and minimizes the loss function of the agent forecasting neural network by adjusting the trainable parameters of the agent forecasting neural network. The loss function describes the difference between actual position data and the position data determined by the neural ODE and minimizing this difference will make the neural ODE more closely map onto the actual position data. The loss function minimizer 108 can, for example, minimize a mean negative log-likelihood. The loss function minimizer can adjust the trainable parameters in the agent forecasting neural network. In embodiments that utilize an encoder neural network, loss function minimizer 108 can also adjust the trainable parameters in the encoder neural network.

In some embodiments, the trained neural network can predict a position of an agent at flexible time horizons that were not necessarily seen during training. Furthermore, the systems described above can use datasets with asynchronous data (i.e., datasets with inconsistent position observation intervals) to train the system.

The agent forecaster neural network may be configured to use various datasets during training.

After training, trained position probability predictor 110 can be utilized to predict conditional marginal distributions of an agent position on flexible evaluation horizons by encoding and processing data known at inference time (i.e., positions of the agent at or prior to inference time and any environmental observations) according to the system's training. The system can be adapted to predict positions that are of the same or of a similar type to those that the system was trained with.

In some aspects, the systems described herein can be a system for training and using an agent forecasting neural network to predict a future position probability of at least one agent, the system including a computing device including at least one processor.

The computing device is configured to receive a dataset comprising at least one observation corresponding to a position of the at least one agent at or prior to an inference time from, for example, memory store 102, encode the dataset using encoder 104, initialize the agent forecasting neural network using the encoded dataset and an observation corresponding to a position of the at least one agent at a horizon time, and where the horizon time is after the inference time, determine a neural ordinary differential equation (ODE) that describes a bijective transformation from a base distribution to the observation corresponding to a position of the at least one agent at the horizon time given the encoded dataset using the agent forecasting neural network via neural ODE determiner 106.

In a variant embodiment, the neural ODE has a warm-up time that dedicates capacity of the agent forecasting neural network to the transformation between the base distribution and a first evaluation point, adjust trainable parameters of the agent forecasting neural network to minimize a loss function based on the observation corresponding to a position of the at least one agent at a horizon time using loss function minimizer 108, and predict a future position probability of at least one agent by encoding a new input dataset and processing the encoded new input dataset in the trained agent forecasting neural network according to its training using position probability predictor 110.

In some embodiments, the dataset can include at least one observation representation corresponding to an environment at, or prior to an inference time. This information can include, for example, periodic LIDAR and video observations of the environment, in the context of autonomous driving examples. This information can help the system make predictions about an agent's movement through time. For example, a stop sign at an intersection can help the system predict that the movement of an agent might pause in front of said stop sign.

In some embodiments, the trainable parameters comprise the warm-up time. The warm-up time is used to provide the neural network with more capacity to convert an arbitrary base distribution into a meaningful probability distribution of the agent's position at a time. The warm-up time can therefore be optimized by the system to provide as much system capacity to the initial transformation as is needed to achieve a particular predictive task.

In some embodiments, the transformation from a base distribution to the observation corresponding to a position of the at least one agent at the horizon time includes a transformation towards one or more observations corresponding to one or more positions of the at least one agent at one or more additional times, wherein the additional times are after the inference time and before the horizon time, and the loss function is further based on the one or more observations corresponding to the one or more positions of the at least one agent at the one or more additional times.

In these embodiments, the system uses the actual position of the agent at several time points between the warm-up time (i.e., the earliest possible time point) and the horizon time (i.e., the last time point) to provide more information that the agent forecasting neural network can use to train itself. The system can adjust the trainable parameters in the neural networks such that it reduces any differences between the predicted positions and the actual positions at these time points. In some embodiments, this can be done by minimizing the mean negative log-likelihood to enable the agent forecasting neural network to more closely generate the transformation between the base distribution and each of the observed positions.

In some embodiments, the at least one observation corresponding to the position of the at least one agent at prior to the inference time includes at least one observation corresponding to a physical position of the at least one agent at or prior to the inference time, the one observation corresponding to a position of the at least one agent at the horizon time includes one observation corresponding to a physical position of the at least one agent at the horizon time, and the future position probability of the at least one agent comprises a future physical position probability of the at least one agent. The physical position can include a 1-, 2-, or 3-dimensional position of an agent in space. The physical position can include a physical position relative to a reference point (e.g., an autonomous vehicle can use itself as a reference point when monitoring the relative position of other vehicles and/or pedestrians).

In some embodiments, an encoding neural network encodes the dataset and the computing device is further configured to adjust trainable parameters of the encoding neural network to minimize a loss function based on the observation corresponding to a position of the at least one agent at a horizon time.

Figure 2:
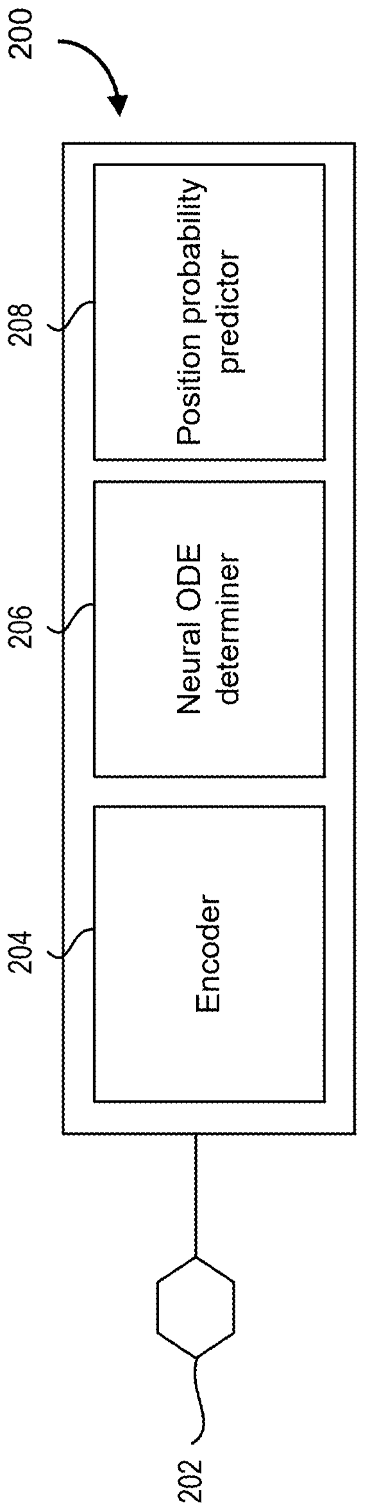
FIG. 2 illustrates a schematic of a system using a neural network to predict marginal distributions of agent positions at flexible time horizons, according to some embodiments.

FIG. 2 illustrates a schematic of a system using a neural network to predict marginal distributions of agent positions at flexible time horizons, according to some embodiments.

FIG. 2 shows an example implementation of a system trained in the learning system represented in FIG. 1. Predictive system 200 includes a detector 202, an encoder 204, a neural ODE determiner 206, and a position probability predictor 208.

Detector 202 is configured to sense the environment of the agent that the system is trying to predict the movement of. In some embodiments, detector 202 can include physical detectors, sensors, or sensor arrays that can take in visual information about an environment (e.g., periodic LIDAR and video observations of the environment). In some embodiments, detector 202 can parse online resources for information about an agent (e.g., headlines or news articles about a company). Detector 202 can determine at least one position of the agent at or before the inference time. In some embodiments, detector 202 is able to determine the instantaneous position of an agent and store that position associated with a measurement time in a memory to create a set of position data prior to an inference time.

In some embodiments, the new input dataset is provided by at least one position detector 202 configured to provide new input observations corresponding to a position of at least one agent at an observation time.

In some embodiments, detector 202 includes multiple detectors. In some embodiments detector 202 includes many different varieties of detector which all take in different information. In some embodiments, some detectors in detector 202 are configured to take in information about an agent's environment that is not directly related to the position of the agent, but can be used by the system to predict the agent's movement (i.e., additional conditioning information). This information can also include environmental data, such as map data, elevation data, expected congestion levels, weather, among others.

Encoder 204 takes the positional information received from detector 202 and/or memory stores and encodes it. In some embodiments, the encoded information includes the position of the agent of interest. In some embodiments, the encoded information further includes information about the environment which is not directly related to the position of the agent, but can be used to predict the future positions of the agent. Encoder 204 can encode the information received from detector 202 and/or memory stores using an encoder neural network that was trained to encode the conditioning information in a manner that maximizes the accuracy of the system's predictions during training.

The encoded information is then passed into the agent forecasting neural network trained to provide the marginal distributions of the agent position based on the encoded information. The agent forecasting neural network can process the encoded information according to its training. This processing can include a warm-up time between the base distribution and the first evaluation point to dedicate more system capacity to the initial transformation.

This agent forecasting neural network can have its neural ODE determined by neural ODE determiner 206. Neural ODE determiner 206 provides the transformation of a base distribution into the probability distribution of finding an agent in a position after the inference time. Using the neural ODE, the system is capable of determining the probability distribution of the agent at any time after the warm-up time using position probability predictor 208. The position probability distribution can be determined for flexible evaluation times allowing for evaluation at irregular time points.

The system can use these predictions in order to, for example, plan movement through a system of agents. For example, when applied to autonomous vehicles, the system can use these future predictions of other vehicle or pedestrian positions to plan a safe route through an intersection that does not collide with any of the vehicles or pedestrians. By enabling a user to evaluate positions at irregular time intervals, the system can determine an agent's continuous movement over time rather than evaluating an agent's position at fixed time points.

In some embodiments, the new input dataset comprises at least one observation corresponding to an environment at or prior to an inference time provided by at least one environmental detector. In such embodiments, some detectors track additional information that is not directly related to the position of an agent, but can be used by the system to accurately predict the future position the agent.

In some embodiments, the at least one agent can be at least one vehicle or pedestrian, the new input observations corresponding to a position of at least one agent at an observation time includes new input observations corresponding to a physical position of the at least one vehicle or pedestrian at an observation time, and the computing device is further configured to direct the movement of a vehicle based in part on a predicted position of the at least one vehicle or pedestrian.

Figure 3:
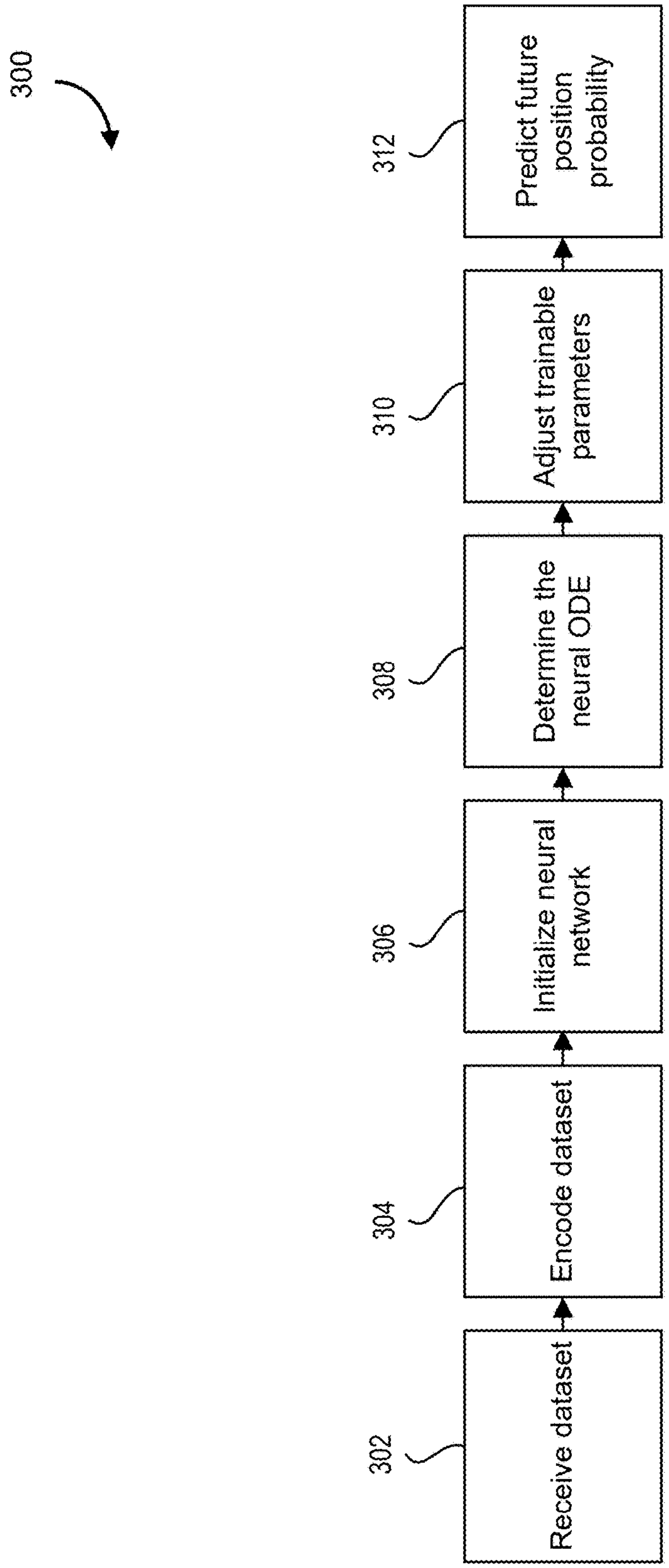
FIG. 3 illustrates a flowchart describing a computer-based method of training and using a neural network to predict marginal distributions of agent positions at flexible time horizons, according to some embodiments.

FIG. 3 illustrates a flowchart 300 describing a method of training and using a neural network to predict marginal distributions of agent positions at flexible time horizons, according to some embodiments.

In some aspects, an exemplary method described herein includes training and using an agent forecasting neural network to predict a future position probability of at least one agent. The method comprising receiving a dataset comprising at least one observation corresponding to a position of the at least one agent at or prior to an inference time (302), encoding the dataset (304), initializing the agent forecasting neural network using the encoded dataset and an observation corresponding to a position of the at least one agent at a horizon time (306), where the horizon time is after the inference time, determining a neural ordinary differential equation (ODE) that describes a transformation from a base distribution to the observation corresponding to a position of the at least one agent at the horizon time given the encoded dataset using the agent forecasting neural network (308).

In a variant embodiment, the neural ODE has a warm-up time that dedicates capacity of the agent forecasting neural network to the transformation between the base distribution and a first evaluation point, adjusting trainable parameters of the agent forecasting neural network to minimize a loss function based on the observation corresponding to a position of the at least one agent at a horizon time (310), predicting a future position probability of at least one agent by encoding a new input dataset and processing the encoded new input dataset in the trained agent forecasting neural network according to its training (312).

Agent Forecasting at Flexible Horizons Using ODE Flows

The following describes a non-limiting example embodiment of the systems, methods, and devices described herein directed, according to various embodiments.

Described herein by way of example is a neural ODE based normalizing flow for the prediction of marginal distributions at flexible evaluation horizons and its application to agent position forecasting. The described architecture embeds an assumption that marginal distributions of a given agent moving forward in time are related, allowing for an efficient representation of marginal distributions through time and allowing for reliable interpolation between prediction horizons seen in training. By solving a variety of density estimations tasks on synthetic datasets the system can conditionally model multi modal data, and the smooth interpolation of marginal distributions between forecasting horizons seen in training.

Experiments on a popular agent forecasting dataset can demonstrate significant improvements over most baseline approaches, and comparable performance to other approaches while providing the new functionality of reliable interpolation of predicted marginal distributions between prediction horizons as demonstrated with synthetic data.

Autonomous driving has benefited tremendously from deep learning and computer vision [1]. The capability of recognizing traffic signs [2, 3], localizing pedestrians [4, 5], etc. makes it possible for autonomous vehicles to "see" the world [6]. However, one critical component for safe and efficient planning in autonomous vehicles is an accurate prediction of the future position of such agents (such as pedestrians or moving vehicles) in the environment [7, 8]. Despite the importance of the position prediction problem, the performance on this task is still far from satisfactory because of the following technically challenging requirements: (1) predictions must be conditioned on the environment, as contextual clues are essential for an accurate prediction (an example given in FIG. 4); (2) predictions are required to be highly multi-modal (shown in FIG. 5) as the real-world environment often exhibits junctions where an agent has N distinct possible future trajectories, and mode collapse in these moments could lead to disastrous planning outcomes; and (3) finally, timely predictions should be available for any potential time into the future, so as to be most useful for planning.

Figure 4:
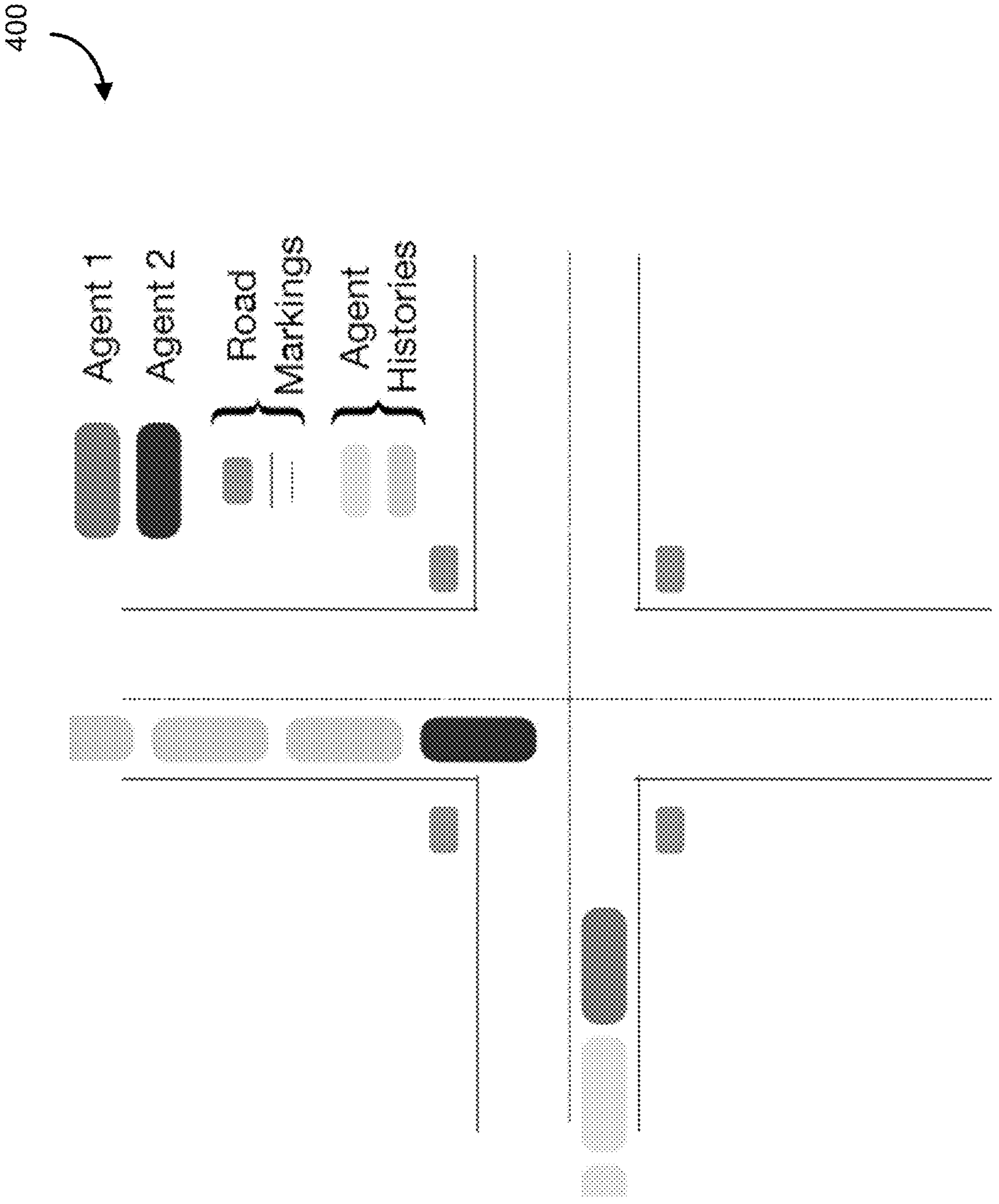
FIG. 4 illustrates the synthesis of complex conditioning information required for agent location prediction, according to some embodiments.

FIG. 4 illustrates in image 400, the synthesis of complex conditioning information required for agent location prediction, according to some embodiments. Agent location prediction requires synthesis of complex conditioning information, e.g. road markings, agent histories, LIDAR, video data.

Figure 5:
FIG. 5 illustrates an example outcome of predicting marginal distributions across agent location at different points in time, according to some embodiments.

FIG. 5 illustrates an example outcome 500 of predicting marginal distributions across agent location at different points in time, according to some embodiments. One possible outcome of systems and methods disclosed herein is to predict marginal distributions across agent locations at any choice of time, shown here for agent 1 (top, blue) and agent 2 (bottom, red).

While the underlying modeled process of an agent's trajectory is continuous, many forecasting models operate on a discretized representation of time chosen during training [7, 9, 10, 11, 12, 14, 15, 16, 17]. The granularity of time-steps used in training can constrain the resolution and utility of these approaches. There is usually no reliable way to infer a prediction for a point between "steps", and generation of predictions for steps not seen in training, when possible, often relies on expensive sampling [7, 9, 10, 11].

Another approach frames the agent forecasting task as one of learning marginal distributions over potential agent positions [14, 15, 16], also known as "occupancy maps", a representation in planning for robotics and autonomous vehicles [1, 7]. By predicting the marginal distribution at a specific point in time, these methods are often superior at capturing the complex multi-modal nature of the data avoiding the challenges of generating diverse trajectories.

Other methods combine both approaches, predicting marginal distributions at a flexible point in time by taking the prediction horizon as an additional conditioning information [12, 17], or by defining a conditional temporal process [18]. Similar to methods which require a step-by-step rolling prediction, these methods can provide predictions at any horizon of interest, but without expensive sampling.

Other approaches demonstrate a conditional temporal process which can produce marginals and trajectories fully continuous in time [18]. However the expressiveness of this approach is ultimately limited by their choice of underlying temporal process, a Wiener process.

Building on such approaches, a normalizing flow based architecture with a structure motivated by the assumption of modelling a continuous temporal process is described herein where the model defines a new temporal process rather than deforming an existing process. Specifically a conditional neural ODE normalizing flow based approach (an example visualization illustrated in FIG. 6). The approach provides i) an expressive, multi-modal conditional normalizing flow based model for predicting agent positions, ii) a model capable of predicting at flexible horizons, including those not seen in training, and iii) a flow architecture that directly targets predicting marginal distributions as a function of time, embedding assumptions that marginal distributions of a given agent moving forward in time are correlated and constraining the change of predicted marginal distributions over time to be smooth.

The approach may also provide a flow architecture that embeds assumptions that, for a continuous process, predirected marginal distributions deform smoothly in time, and may provide demonstrations on both synthetic data, and an important agent forecasting dataset. According to some embodiments, the expressive multi-modal conditional normalizing flow based model and the flow architecture enables predicting at flexible horizons.

Figure 6:
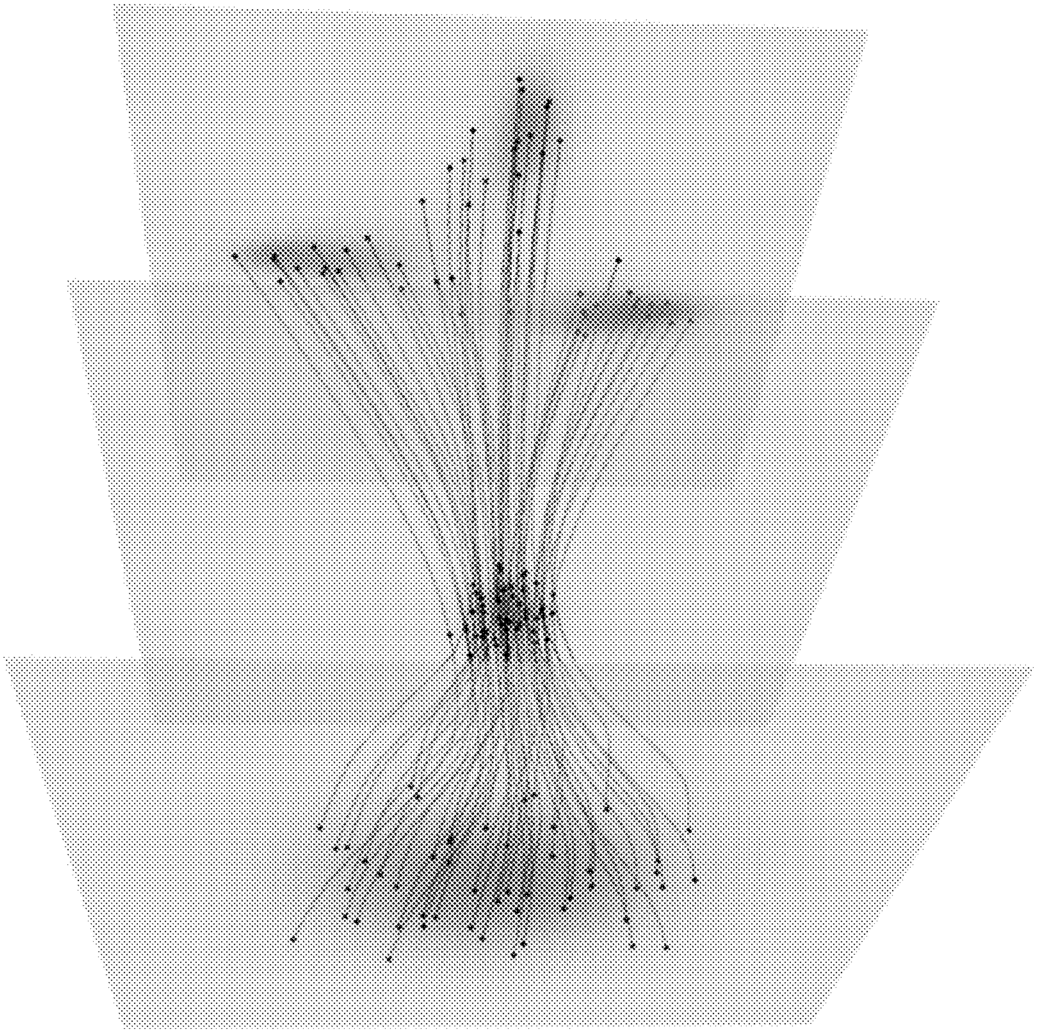
FIG. 6 illustrates an exemplary flow based architecture connecting marginal predictions across horizons.

FIG. 6 illustrates an exemplary flow 600 based architecture connecting marginal predictions across horizons. An exemplary continuous flow based architecture, explicitly connecting marginal predictions across horizons is illustrated.

Here, a base distribution (left) is connected to a marginal prediction at 2 seconds (middle) and 8 seconds (right) by a single neural ODE. Black lines show sample trajectories, corresponding to solutions to the ODE with an initial value taken from the base distribution.

The proposed framework is related with two broad families: (1) ode based time-series forecasting models, and (2) distribution based forecasting models.

Neural ODEs for Time Series Forecasting

Neural ODEs [19] provide a flexible approach to repeated neural network layers, where those repeated discrete neural network layers are interpreted as discrete approximations to a differential equation expressed as a function of depth. Depth might be a proxy for time in a time series encoder-decoder model, and that a neural ODE might describe a continuous normalizing flow.

Approaches explore embedding neural ODEs in models designed to process sequential data, like Recurrent Neural Networks (RNNs), replacing the hidden state with a neural ODE which evolves as a function of time [20, 21, 22]. These approaches are principally pre-occupied with solving the problem of encoding asynchronous time series data, in contrast described systems and methods instead focus on predicting the evolution of a probability distribution in what is assumed to be a continuous process.

In some approaches the model learns a distribution through time by flowing from the target distribution to a Wiener process [18]. This approach allows for an efficient estimation of the marginal distribution at any target horizon of interest. A distinction in the method is the continuous prediction as a function of prediction horizon comes from the choice of a Wiener base distribution, separate from the choice of flow model. In the present approach, the continuous behaviour is instead a direct result of the flow architecture used, defining a new temporal process rather than deforming an existing one.

Other approaches use neural ODE based flows to connect multiple distributions [23, 24]. As in the described systems' and methods' architecture, these models leverage a neural ODE flow to smoothly interpolate between multiple complex distributions. However in these models this transformation is not aligned with the temporal axis of the observed data.

Similar to the described architecture, some approaches use a neural ODE flow to connect predictions at several horizons, aligning ODE 'time' with the time of observations [25]. However these approaches use no conditional information, and generate plausible trajectories between observed data rather than attempting to forecast future marginal distributions.

Some approaches explore a similar architecture for the related problem of point processes, and also utilizes a continuous normalizing flow to describe a marginal distribution across predicted event features as a function of target time [26]. However this approach differs from the presented approach as this approach is principally concerned with conditioning on the features and timing of past events, to predict the timing and features of discrete future events, where the presented approach is concerned with the smoothly interpolated prediction of an underlying continuous process (e.g. the path of a vehicle) using a synthesis of extremely high dimensional conditioning information (lidar, cameras etc.). Practically this means that the way conditioning information is passed to the continuous flow model is quite distinct in the two approaches.

Specifically, in the model described in [26], an attention mechanism allows sharp changes in the conditional distribution as a function of time, consistent with modelling a discontinuous point process. In the presented systems and methods, a single vector of conditioning information is used across all time, consistent with modelling a continuous temporal process, and allowing for the smooth interpolation of marginal through time, which is a core functionality the presented approach provides in contrast to other approaches.

Distribution-Based Forecasting Models

The forecasting of distributions on a target variable is a technical problem, with a number of approaches that attempt to predict either joint predictions over time, or marginal distributions conditioned on time.

Auto-regressive forecasting models provide a way to generate trajectories of any length [9], with some models allowing for the prediction of expressive distributions which can capture complex multi modal behavior [10, 27] with a number of approaches utilizing normalizing flows in some way [28, 29, 30, 31, 32]. However in order to infer the statistics of a marginal distribution beyond the next time-step extensive sampling is required, and in these approaches a fixed discrete sampling in time is assumed.

In some approaches a GAN is used to learn an implicit joint distribution across a specific series of time-steps, to predict trajectories [33]. Further, this approach is incapable of interpolation or extrapolation beyond predictive horizons used in training.

Some approaches propose an architecture which explicitly relates marginal distributions in time [34]. However these models are discrete in both time and agent position, and do not use the formalism of Normalizing Flows. Instead learning direct transforms on a discretized representation of the marginal distribution or an "occupancy grid" [1, 7].

Some approaches describe a model which uses a series of affine transforms to learn a conditional joint distribution over a selection of agents and horizons [12]. This formulation is similar to a discrete version of models described herein with a much less expressive choice of Normalizing Flow, and, unlike models described herein, is limited to only predict times seen in training.

One approach uses a conditional auto-regressive flow for marginal prediction at flexible horizons [17]. Here however the flow model is a series of discrete layers, specifically a conditional extension of Neural Autoregressive Flows [35] with the predicted horizon passed as an explicit conditioning variable.

Method

Figure 7:
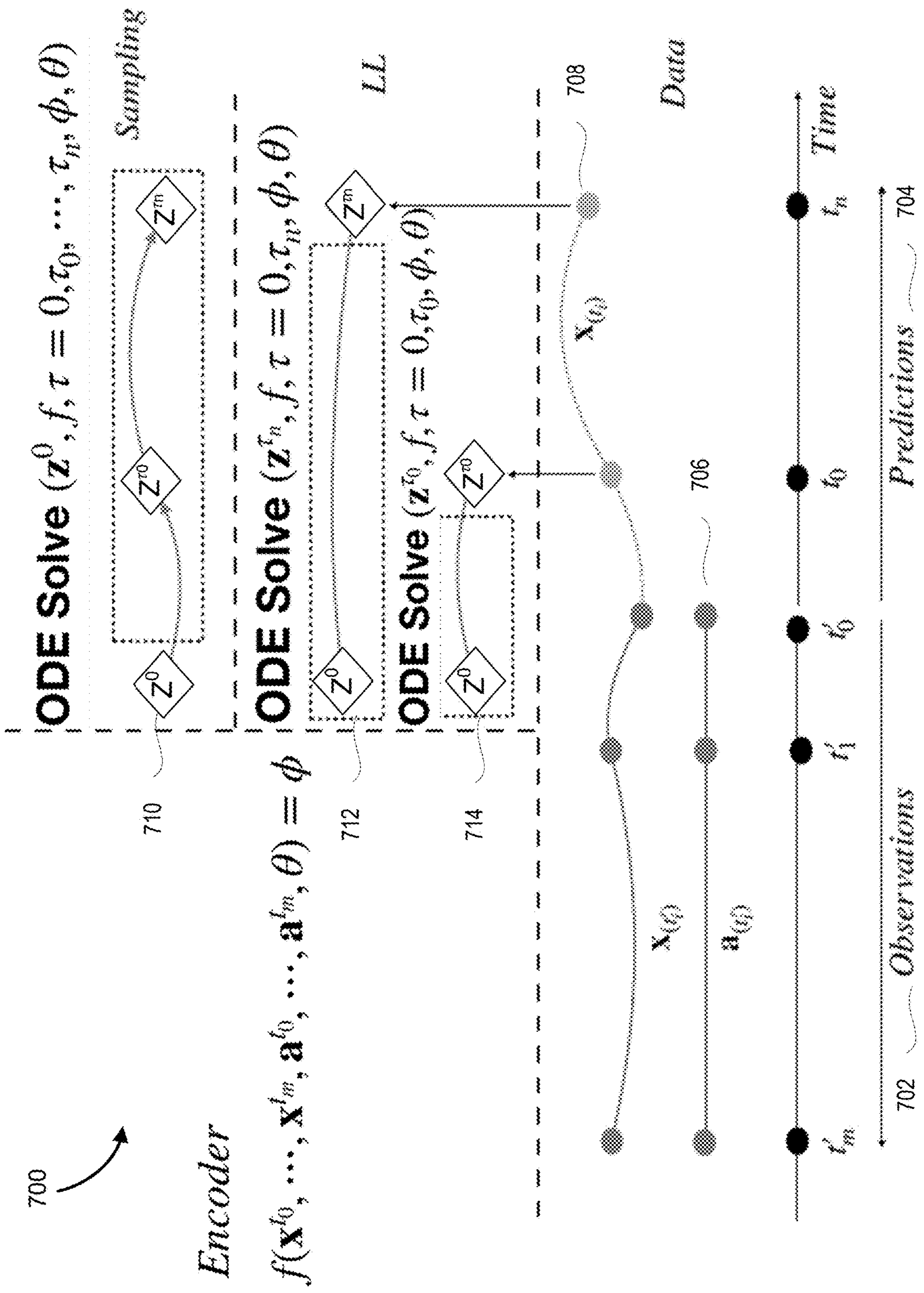
FIG. 7 illustrates an exemplary computation graph and model outline of the systems and methods described herein, according to some embodiments.

FIG. 7 illustrates an exemplary computation graph and model outline 700 of the systems and methods described herein, according to some embodiments. Observations are shown at 702 and predictions are shown at 704.

Data. Shown in the line 708 is the process that some embodiments can predict, with observations $x_{t_j}$ in the past and $$x_{t'_j}$$

in the future shown as circles. At inference only points $t_m$ through $t_0$ are available, with $t'_0$ through $t'_n$ used in training. The process shown in line 706 represents additional conditioning information passed to the encoder that is not predicted in some embodiments, reported at points $a_{t_j}$ e.g. periodic lidar and video observations of the environment. Prediction points $x_{t_i}$ may be loss from pre-defined horizons.

Encoder. Observations from $t_m$ through $t_0$ are combined in a neural network to produce a single vector of conditioning information $\phi$. In some embodiments, $\phi$ may be the model parameter for the model, and $\phi$'s parameters may be trained and elements tuned. $\phi$ may be an embedding of historical parameters, and more particularly in some embodiments, output $\phi$ may be a latent embedding of the historical data. $\phi$ may, in some embodiments, be used as input for solving.

LL. Log-likelihood is determined by solving the neural ODE given the observation $z^{\tau_n}$ at time ODE time $\tau_n$, and conditioning information $\phi$ to find the corresponding points in the base distribution $z^0$ and the log determinant of the transform given by the trace of transform (boxed 712). The log-likelihood may be aggregated to find sampling. This step occurs when training the model.

Sampling. Here the base distribution is first sampled to find $z^0$, then solve for that point, conditioning information $\phi$, and n ODE time points of interest $\tau_0, \ldots, \tau_n$ to find points on the corresponding trajectory $z^{\tau_0}, \ldots, z^{\tau_n}$ (boxed 710).

At inference time, the system is utilized to sample from base distribution at 714, which is usually Gaussian distribution. The trained ODE solver will map it to distributions at future steps following the dynamics learned.

In an exemplary application, the task considered is predicting marginal distributions over future vehicle positions based on asynchronous conditioning information. Specifically, given 2D positional data $$x := \{x_i^{(t'_j)}\}_{i',j}$$

for a set of dependent agents $i' \in A'$ at asynchronous times $t_j' \in T'$, Applicants are interested in the marginal distributions $$p\left(\{x_{i'}^{(t_j)}\}_i\right),$$

with $I \in A \subseteq A$ and $T \ni t_j > \max(T')$, where T is a set of target horizons. A number of target horizons will be dependent on the task and data available. If in the training dataset, there are five target horizons, the system can train on five horizons.

In practice, the system may also use image-based auxiliary $$information_a = \left\{a_{i'}^{t'_j}\right\}_{i',j},$$

such as Lidar scans, and write $\phi=\{x, a\}$ to summarize all available information up to time $t_0 := \max(T)$. Due to the nature of the data, timepoints (e.g., T, T') will be principally referred to, however the model is continuous in time, as a such it will at times be necessary to refer to the continuous axis of time t which those observations lie on. Further the positional data x is taken to be the discrete vectorized observations of a function x(t).

This approach builds upon previous work on normalizing flows and its continuous counterparts. Provided is a brief overview of the basic ideas underlying these models and reference [19, 36, 37, 38, 39] for additional details.

Normalizing Flows (NF; [38]). Normalizing flows use a composition of n bijective functions $T_i$ to transform a simple base distribution $p_Z(z)$ into a complex target distribution $p_X(x)$. The relationship between the two distributions is given by the change of variables formula, $$p_x(x) = p_z(T^{-1}(x))\left|\det\frac{\partial T^{-1}}{\partial x}\right|, \tag{1}$$

where $$T^{-1} := \bigcirc_{i=1}^{n} T_i^{-1}$$

and $$\det\frac{\partial T^{-1}}{\partial x} := \prod_{i=1}^{n} \det\frac{\partial T_i^{-1}}{\partial\left[\bigcirc_{j=i+1}^{n} T_j^{-1}\right](x)}.$$

This compositional nature of normalizing flows is used to construct complex flows out of simple transforms with tractable Jacobian [36, 37].

Neural ODE [19]. Neural ODEs are a natural tool for describing NF architectures [19, 39], allowing for the efficient calculation of the log determinant of a given transform. For a neural ODE transform $$\frac{\partial z(t)}{\partial t}$$

parameterised by a neural network $$\frac{\partial z(t)}{\partial t} = f(z(t), t; \theta),$$

the log density for the above transform is given by:

$$\frac{\log p(z(t))}{\partial t} = -tr\frac{\partial f}{\partial z(t)}dt. \tag{2}$$

Given an observation z(t), the system can solve the initial value problem to find the equivalent point in the base distribution z(0):

$$\log p(z(t)) = \log p(z(0)) - \int_0^t \frac{\partial f}{\partial z(t)}dt. \tag{3}$$

Normalizing Flows with Informative Base Distributions

Normalizing flows describe the relationship between two distributions, one base distribution of known characteristics, and one complex target distribution. As it is assumed that a sufficiently expressive flow makes the choice of base distribution irrelevant [36, 37], the base distribution is commonly chosen as a simple Gaussian distribution. However, other approaches have explored constructions where the choice of base distribution embeds information about the target distribution, allowing good approximation of the target distribution with simpler flow transforms [18, 40, 41]. For example, for a target distribution with heavy tails, choosing a base distribution with similar heavy tails can be more effective than a wide variety of modern complex NF transforms in capturing the target distribution accurately [41].

To model the distribution of $p(x(t)|X(t_0))$ for a range of value of $t>t_0$, where $X(t_0)$ denotes the history of observations up to $t_0$, a desired property of the model would be that the distributions of $p(x(t)|X(t_0))$ and $p(x(t+\epsilon)|X(t_0))$ should be similar for small E and identical as $\epsilon \to 0$. To ease notation, reference to the conditioning information $\phi$ are dropped from now on. In other words, p(x(t)) can be served as informative base distribution $p(x(t+\epsilon))$. This can be realized by incrementally transforming distributions as time progresses. Therefore the proposed model can be formulated as follows: at any target time in the future, the target distribution $p(x(t+\epsilon))$ can be described as a transform T (taken to be normalizing flow) from the previous timestep p(x(t)):

$$p(x(t+\epsilon)) = p\left(T_{t+\epsilon}^{-1}x(t+\epsilon)\right)\left|\det\frac{\partial T_{t+\epsilon}^{-1}}{\partial x(t+\epsilon)}\right|. \tag{4}$$

Further, one can take advantage of the fact that the series of flow transforms at any point in a sequence building out from the base distribution represents a valid normalizing flow. Therefore, a network may be implemented with multiple outputs, with each output further from the base distribution learning to predict a point further into the future. This formulation, inspired by recent progress on informative base distributions for NF [18, 41, 40], motivates the proposed architecture described below.

Representation Through a Continuous, Conditional, Normalizing Flow

Built upon the discrete model described above, the proposed NF architecture is realized by adopting a neural ODE representation. The continuous version of the above architecture is thus implemented as a neural ODE with multiple sequential evaluation points in ODE "time" corresponding to sequential target time-steps (FIG. 7). By taking this approach, the model can, with minimal regularization [42], learn reasonable interpolations between evaluation points during a training phase, allowing the system to produce valid marginal distributions at arbitrary target times. The proposed model can utilize the above-discussed "prior" intuition when constructing marginal distributions by taking marginals at earlier time-steps as informative base distributions.

To facilitate asynchronous conditioning when predicting conditional marginal distributions, a vector of conditioning information from an encoder model is passed to the neural ODE. Specifically, as an extension of [19, 39], this information is concatenated to the input of every fully connected layer described by the neural ODE transform $$\frac{\partial z(\tau)}{\partial \tau}$$

such that for some parameters $\theta$, and conditioning information $\phi$:

$$f(z(\tau), \tau, \phi; \theta) = \frac{\partial z(\tau)}{\partial \tau}. \tag{5}$$

Following [19, 39], given an observation $z(\tau)$, the initial value problem can be solved to find the equivalent point in the baseline distribution $z(0)$:

$$\log p(z(t)) = \log p(z(0)) - \int_0^{\tau} tr \frac{\partial f}{\partial z(t)} dt. \tag{6}$$

Determining likelihood estimates at multiple horizons of interest involves solving the initial value problem for a different choice of t, where here the temporal axis of the ODE is explicitly aligned with the axis of time in the data-set of interest. A 'trajectory' can be generated by sampling from the base distribution then solving the ODE for sampled point at t=0, however unlike a true trajectory the only source of stochasticity is the initial sample from the base distribution.

Time and Representational Complexity. One practical consideration when designing such a model is the necessary transformation capacity required between different target times, as well as the transformation from the initial base distribution to the earliest possible predicted time $t'_0$.

First, it may be noted that representational power in a neural ODE is proportional to the "time" range evaluated.

Second, it may be suggested that it is reasonable to assume that the drift in the marginal distributions over time is linearly proportional to the time between them.

Taken together this suggests that a linear relationship between ODE "time" and target time can be reasonable. The one clear exception to this is the earliest possible predicted marginal, at some time $t'_0$. This distribution can be arbitrarily distinct from the base distribution, and the capacity required to transform from the initial base distribution to a valid marginal at $t'_0$ can be considerably larger than the capacity needed from $t_j$ to $t_j+\epsilon$.

To solve this problem a "warm-up" period is introduced between the base distribution and the first evaluation point, with the length of the warm-up period optimized as a parameter in training. With this formulation, the translation from time in the target space $t_j$ to time in the ODE space $\tau_j$, given the warm-up period set by the parameter $\alpha$ is given simply as $\tau_j=\alpha+t_j$.

Training. The proposed model may be optimized by minimizing the mean negative log-likelihood of N target horizons and M agents. Therefore, the optimization objective, in some embodiments, can be formulated as:

$$\mathcal{L}_{NLL}(f_\theta(\phi), x) = -\sum_{i=0}^{M} \sum_{j=0}^{N} \log\left(p_\theta\left(x_i^{t_j} \middle| \phi, t_j\right)\right)\Big). \tag{7}$$

Although the model is trained on a finite selection of time-steps, inference (evaluation) can occur at any time.

In other embodiments, the proposed model may be optimized by minimizing the mean negative log-likelihood of distributions at |T| target horizons. Therefore, the optimization objective, in some embodiments, can be formulated as:

$$\mathcal{L}_{NLL}\left(f(z(t), t, \phi; \theta), \{x_{(t_i)}\}_i\right) = -\sum_{i=0}^{|T|} \log\left(p_{t_i}\left(x_{(t_i)} | \phi, t_{i,}, \theta\right)\right)\Big) \tag{8}$$

Note that although the model, in some embodiments, may be trained on a finite selection of time-steps, inference (evaluation) can be conducted at any time.

Evaluation

The ability of the model to generate realistic position estimates for an agent at a future time in simple synthetic datasets and complex multi agent environments, and/or complex autonomous environments can be demonstrated.

Position Estimation on Synthetic 2D Data

In order to explore the model's ability to interpolate and extrapolate through time a synthetic multi-modal temporal process dataset was created. This exemplary process consists of radially growing angular distribution bands. The bands have 3 different modes. The modes control the angular division of distributional bands. At each time step the radial distance of the band grows with step length drawn from a normal distribution. Conditioning information on the number of modes $n_m \in \{1, 3, 8\}$ is encoded using an MLP before concatenated to every layer of the neural ODE flow in place of $\phi$. The model was trained on a specific subset of time points $t \in \{10, 20, 40, 50, 60, 70\}$, then evaluated at a variety times never seen in training, including examples of both interpolation and extrapolation. Performance on log likelihood estimation are comparable to a model trained explicitly on held out times. Full results are show in FIG. 9, qualitative results are shown in FIG. 8.

Figure 8:
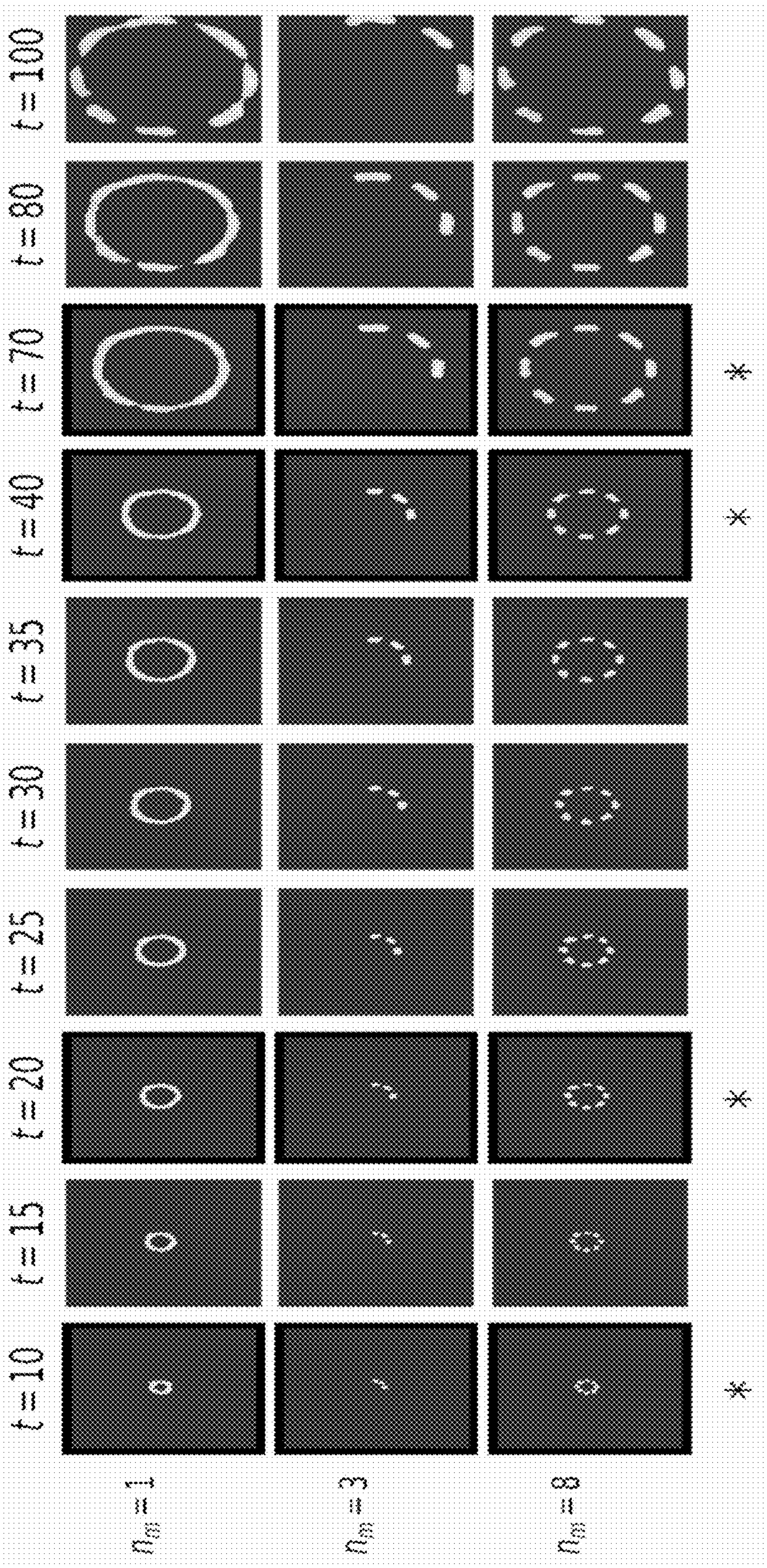
FIG. 8 illustrates interpolation in time using systems and methods described herein with synthetic data, according to some embodiments.

FIG. 8 illustrates interpolation in time using systems and methods described herein with synthetic data, according to some embodiments. Plots of predicted likelihood vs. x and y co-ordinates at a series of times into the future. The number of modes $n_m$ was provided as conditioning information, and times marked with * were seen in training. The times shown here are a subset of those in FIG. 9.

Qualitative results 800 shows the number of modes on the y-axis, $n_m$. The number of modes can be seen in the images, for example in the row where $n_m=3$, three bands can be seen, and where $n_m=8$, eight bands can be seen. Qualitative results 800 shows interpolated and extrapolated predictions, in addition to target horizon predictions, marked with * seen in training.

Qualitative results 800 provide illustration of the strength of the predictions, and the strength of the model. This can further be seen in the full results shown in FIG. 9.

FIG. 9 illustrates in table 900 performance (NLL score) on target horizons, according to some embodiments. Scores are based on single model trained on all three mode types. Number of mode $n_m$ is treated as a conditioning variable of the model. • marks the model trained on times marked with * for respective columns, and interpolated/extrapolated to times with no *. ○ marks a model trained and evaluated only on times not marked with a *. Performance can be seen to be broadly equivalent between the two models, which demonstrates an ability to both interpolate and extrapolate for unseen target horizons.

Following [17], an extension of the synthetic Gaussian experiment from [35], where a single model conditionally represents one of three multi-modal configurations was explored. For this model, conditioning information $n_m \in 0, 1, 2$ is encoded using an MLP before concatenated to every layer of the neural ODE flow in place of $\phi$.

Results are shown in FIG. 10, performance is comparable to the HCNAF approach and demonstrates that the choice of a conditional neural ODE based normalizing flow is capable of conditionally representing complex multi modal data.

FIG. 10 illustrates in table 1000 the NLL for the synthetic Gaussian experiments, according to some embodiments. The AAF and NAF results are for individual models for each configuration. The HCNAF and OMEN results are for a single model across all three configurations. Results for AAF, NAF, and HCNAF models are taken from [17].

Agent Forecasting Experiments

Baselines and Ablations: Results from the model are compared to several SOTA approaches for likelihood estimation on agent forecasting. While all baselines are capable of producing likelihood estimates for agents and/or times seen in training, only the full model described herein and the CTFP model [18] are able to produce likelihood estimates for unseen time points.

Minor extensions are made to the CTFP [18] model to provide a functional baseline. Specifically additional encoding information was concatenated with the output of the ODE-RNN, and an extra loss on extrapolating the predicted process into the future was added in training.

OMEN-discrete has a separate ODE flow transform between each inference time point in training. In this way it resembles a model following Eq. 4 where $\epsilon$ in the delta between forecast time points in the training set, and each neural ODE transform represents a separate but sequential normalizing flow transform. This ablation is expected to have superior expressive power as the representation no longer is constrained to be fully continuous in time, and each separate ODE transform can learn its own ODE stop time, allowing for expressive power between time steps to vary. However it does not allow for continuous interpolation of marginals in time.

OMEN-nocon has no conditioning information $\phi$ appended to the neural ODE. This ablation is expected to have significantly worse overall performance as the model only learns a distribution over all points observed in the training set, and the task of predicting agent locations is expected to be strongly conditional on the available environmental information. This demonstrates the importance of the extension to [19, 39], presented in the described systems and methods include conditioning information.

Metrics: Following other approaches [12] results are presented here using the extra nats metric $\hat{e}$ which provides a normalized and bounded likelihood metric. $\hat{e} := H(p', q) - H(\eta)/(|T| \cdot N_D)$ where $H(p', q)$ is the cross entropy between the true distribution p' perturbed by some noise $\eta$ (taken here as $\eta = N(0, 0.01^2 \cdot I)$ to match [12]), and the model's prediction q, $N_D$ is the number of dimensions in the position data, and $H(\eta)$ can be calculated analytically. T is the number of horizon points, and $N_D$ is the number of dimensions in the position data. Following [17], the marginal predictions are combined at separate horizons to form a joint prediction to allow direct comparison with [12].

Precog Carla Dataset: The PRECOG Carla dataset [12] is comprised of the complex simulated trajectories of an autopilot and four other agents in the Carla traffic simulation [43], and includes additional Lidar data centred on the main autopilot agent. Here train, validation, and test data subsets were chosen to match [12]. This model and its ablations were trained to minimize the NLL of PRECOG Carla's autopilot for all future time steps available in the dataset. Results are presented in FIG. 11.

FIG. 11 illustrates in table 1100 PRECOG-Carla single agent forecasting evaluation, according to some embodiments. In these results, lower may be better. All models use PRECOG-Carla Town 1 Training set in training, and are evaluated on the PRECOG-Carla Town 1 test set. OMEN, OMEN-nocon and the CTFP [18] models, marked with *, are able to produce likelihood estimates for unseen target horizons.

For Precog Carla dataset, an encoder network which is a partial re-implementation of that in [17], is used. LSTM modules encode the past trajectories of agents in the environment, and a residual CNN encodes Lidar information from a single main agent. Specifically two seconds of historical position data at a sampling of 5 Hz or 10 historical points in time, are provided to the LSTM. The encoded trajectory and Lidar information is combined in a MLP and concatenated to every layer of a Neural ODE describing a normalizing flow. The model may be trained and evaluated on the future position data of the main agent over four seconds at a sampling of 5 Hz, or 20 future time points.

In addition to FIG. 11, qualitative results are also provided. FIG. 12A, 12B, 12C, FIG. 13A, 13B, 13C and FIG. 14A, 14B, 14C show example predicted conditional marginal distributions for four of the twenty horizons in the Precog Carla Dataset. All examples are taken from the precog carla town01 test set.

Figure 12A:
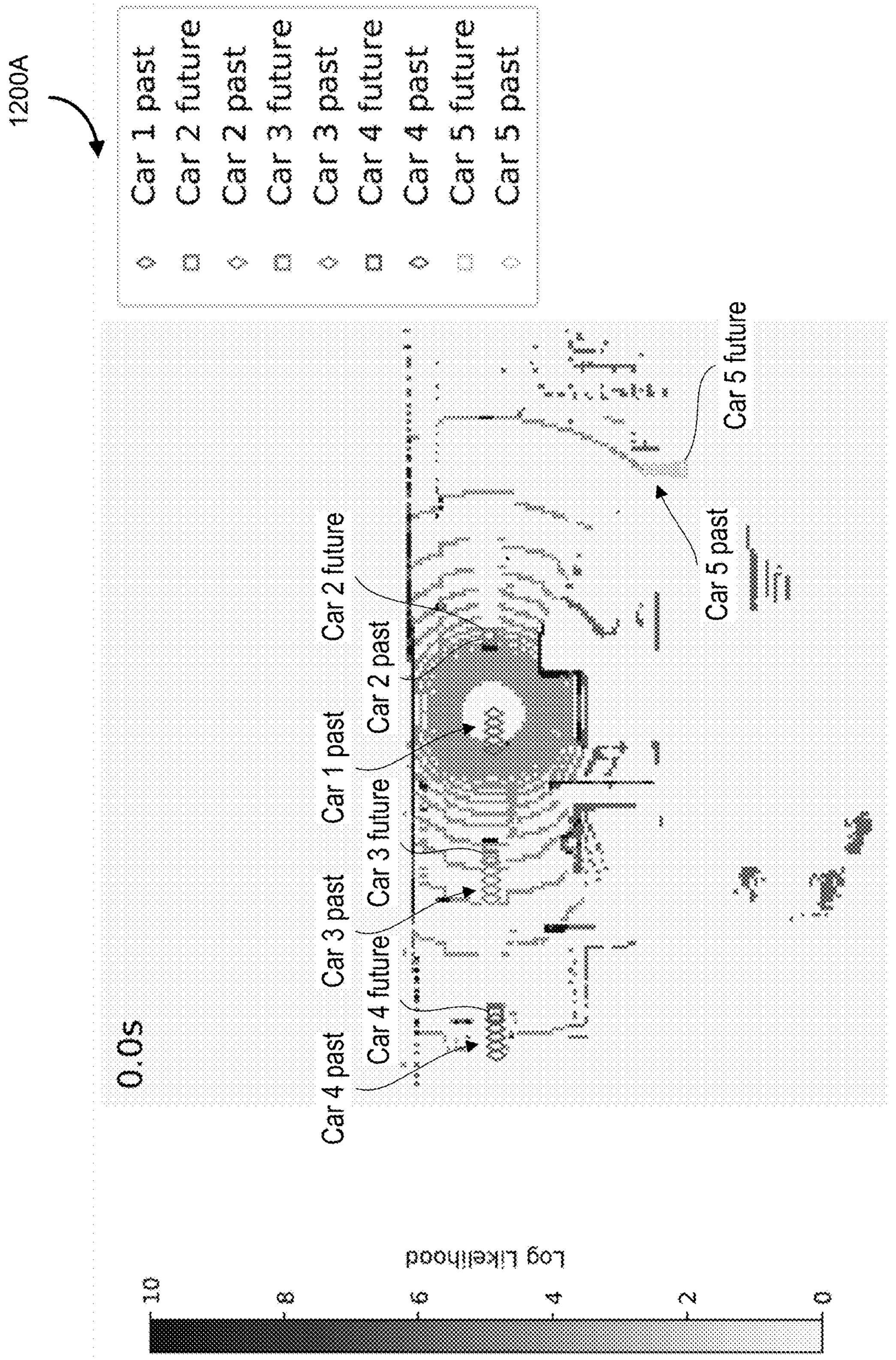
FIG. 12A, 12B, 12C, FIG. 13A, 13B, 13C, and FIG. 14A, 14B, 14C illustrate example Precog Carla Predictions. The examples predict conditional marginal distributions for four of the twenty horizons in the Precog Carla Dataset, according to some embodiments.
Figure 12B:
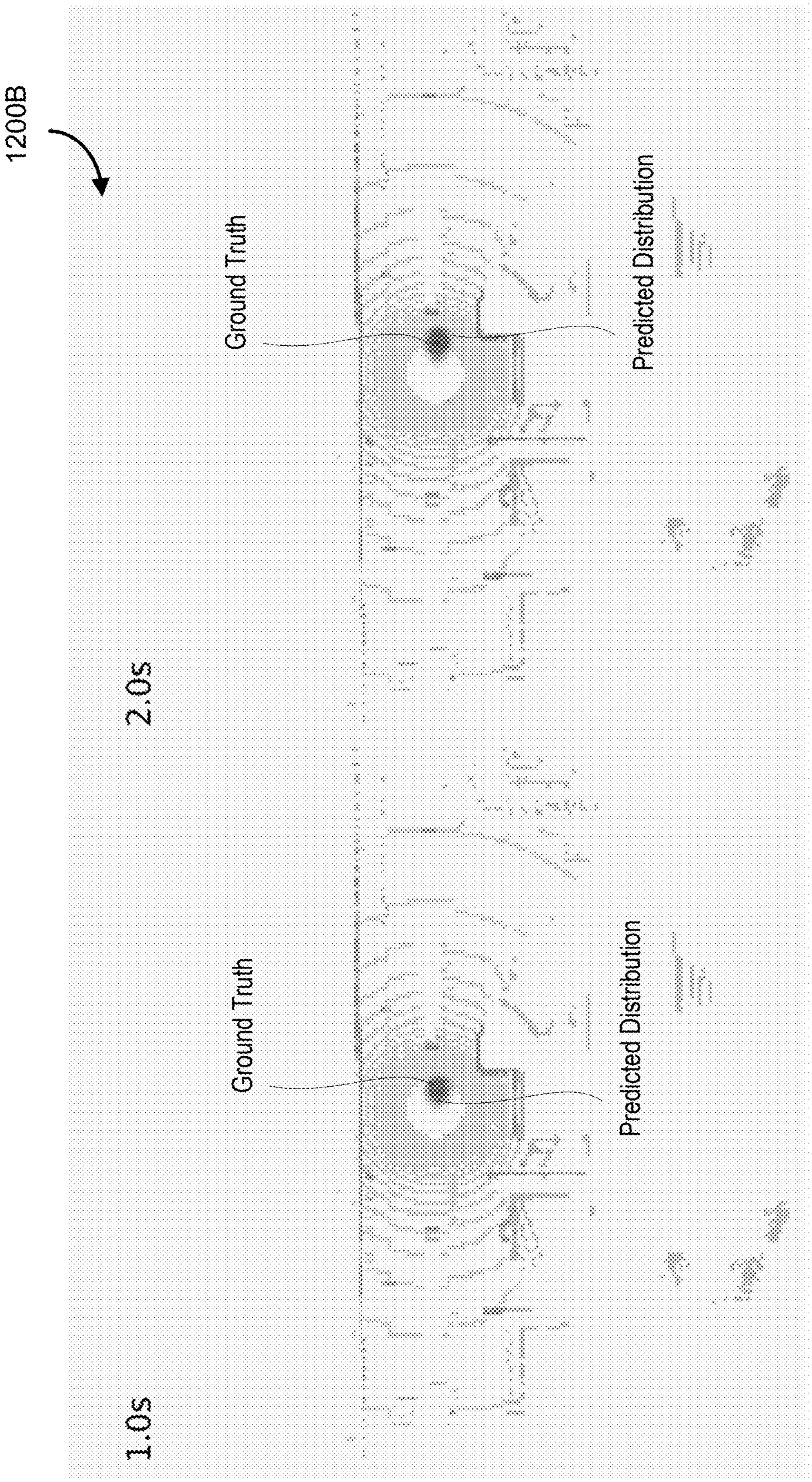
Figure 12C:
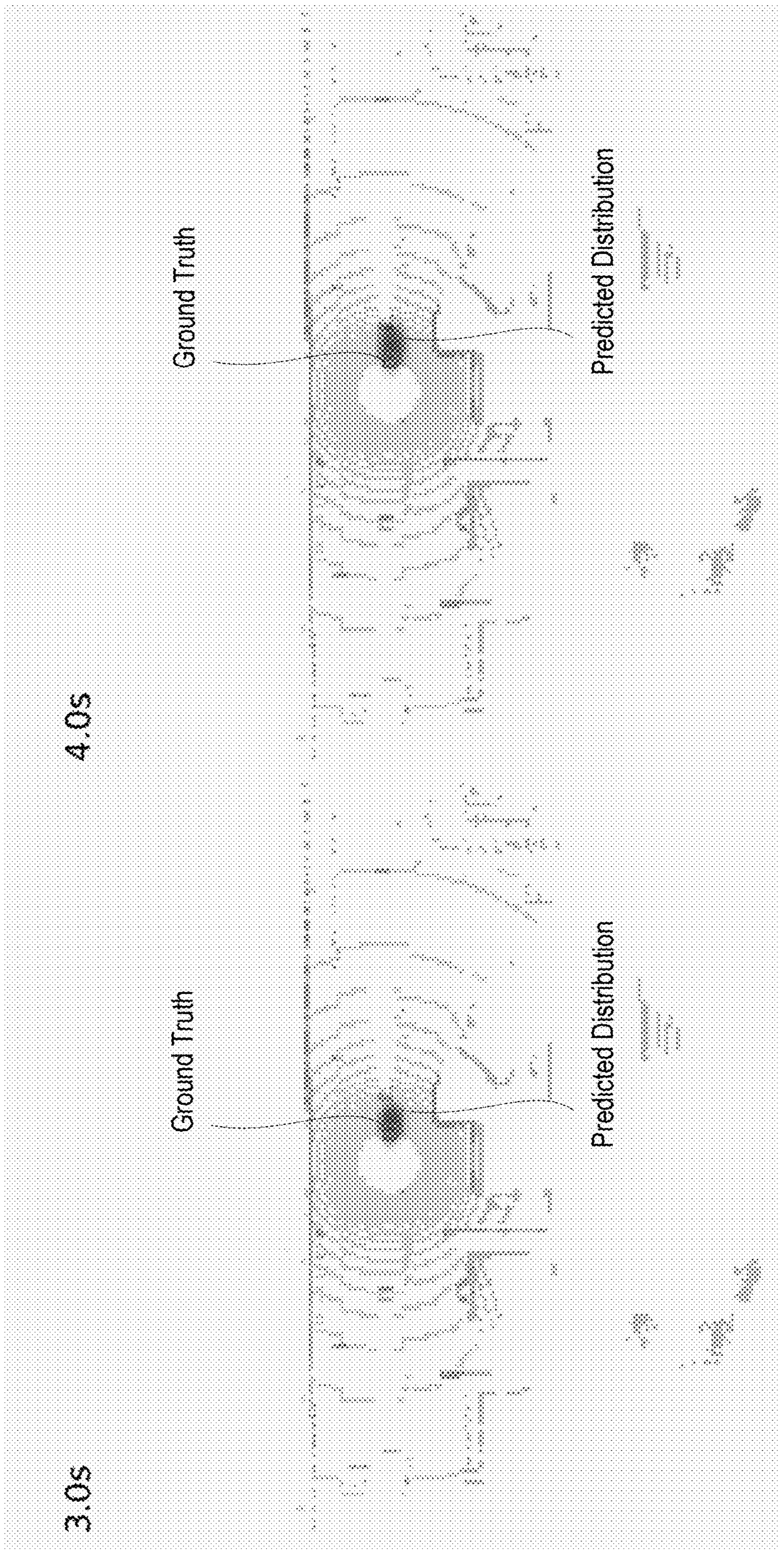
Figure 13A:
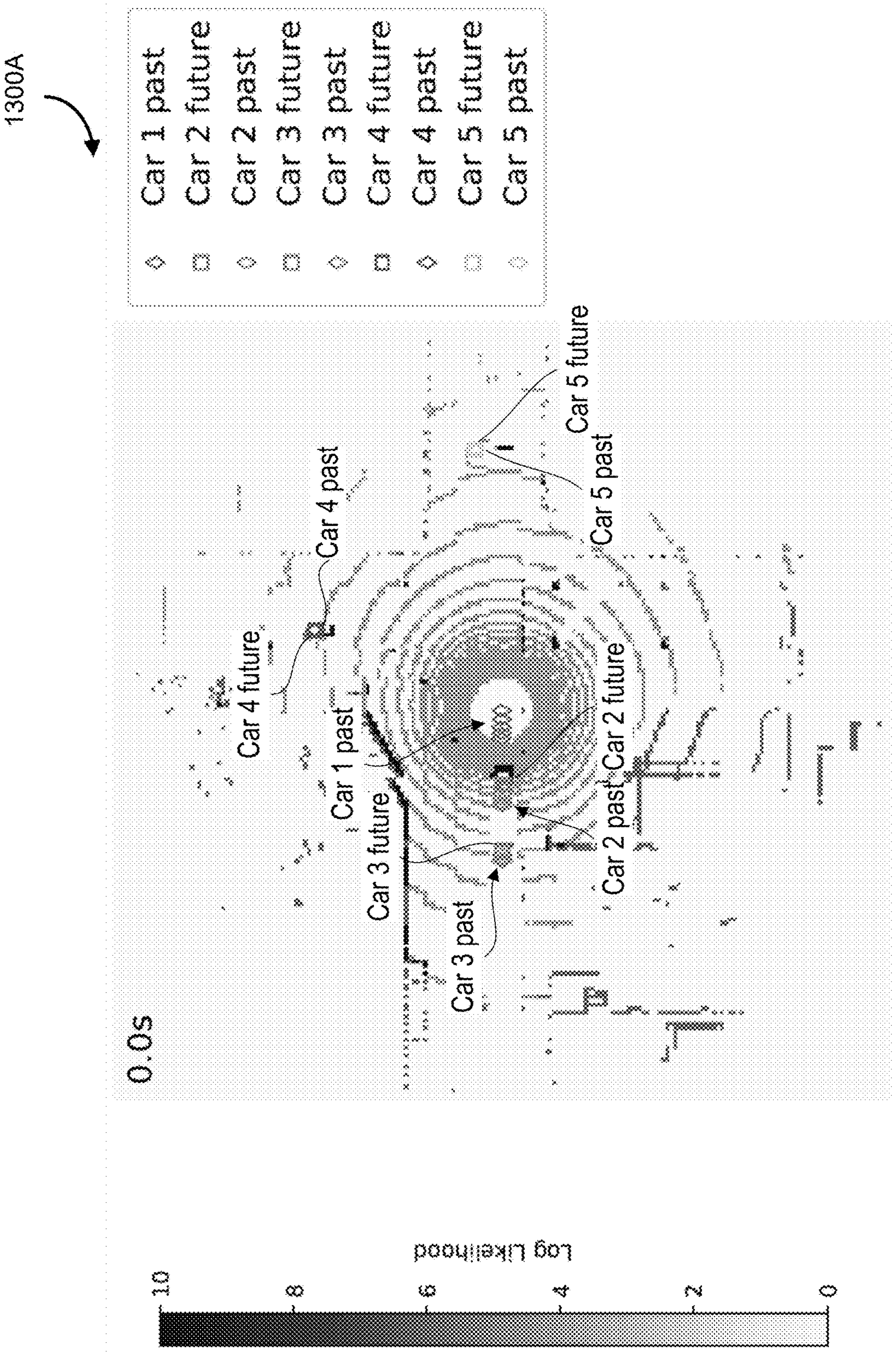
Figure 13B:
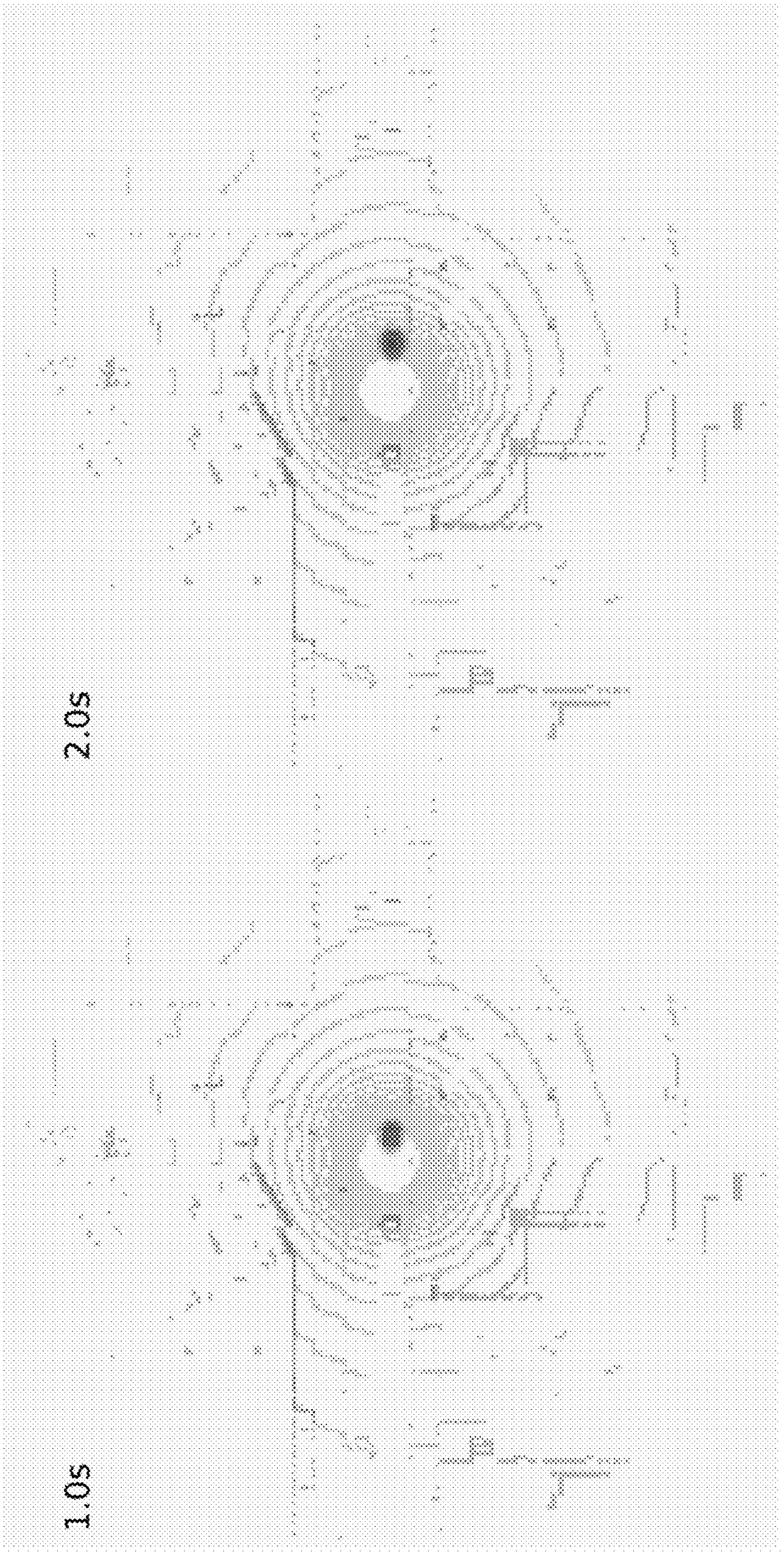
Figure 13C:
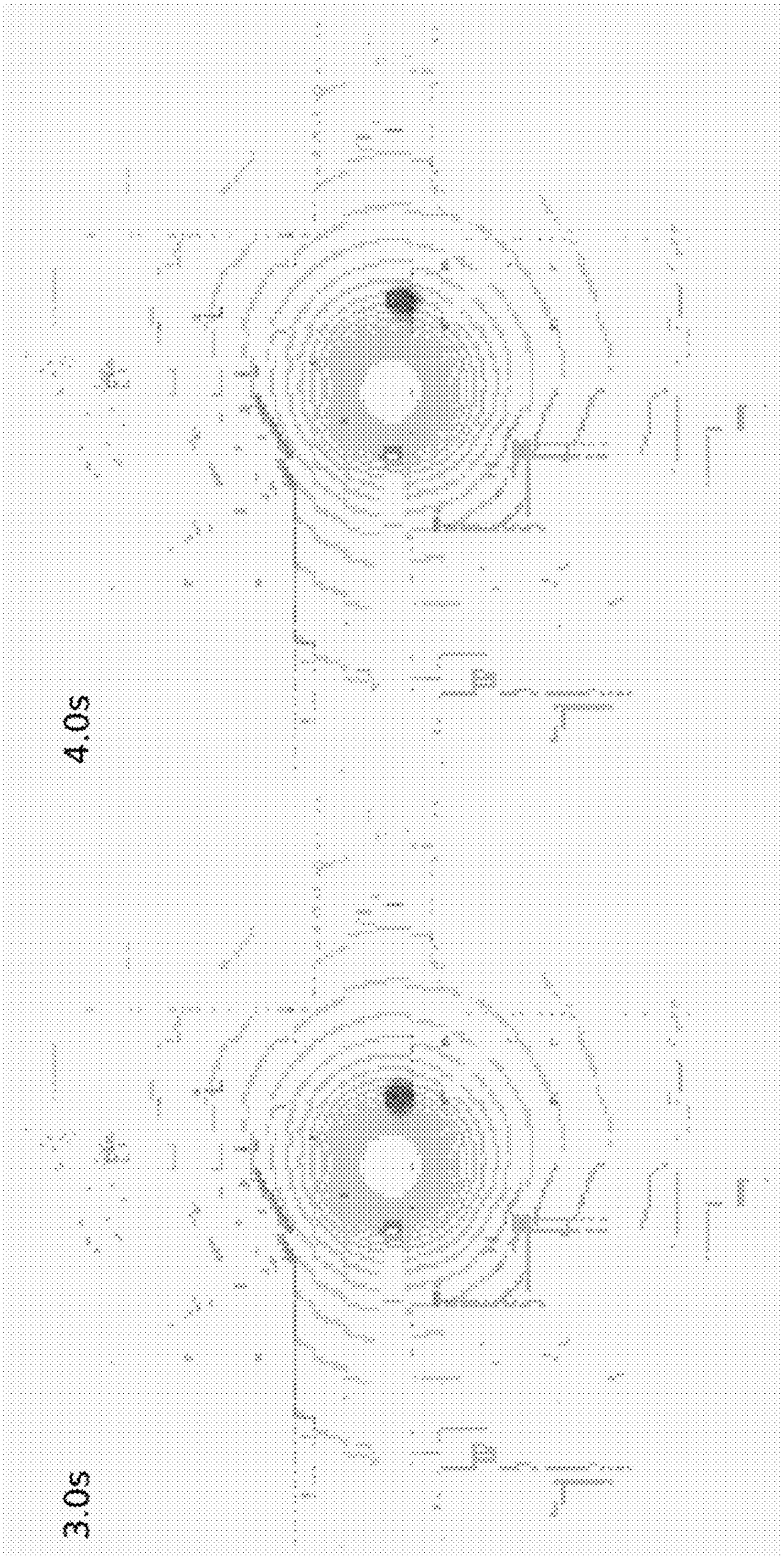
Figure 14A:
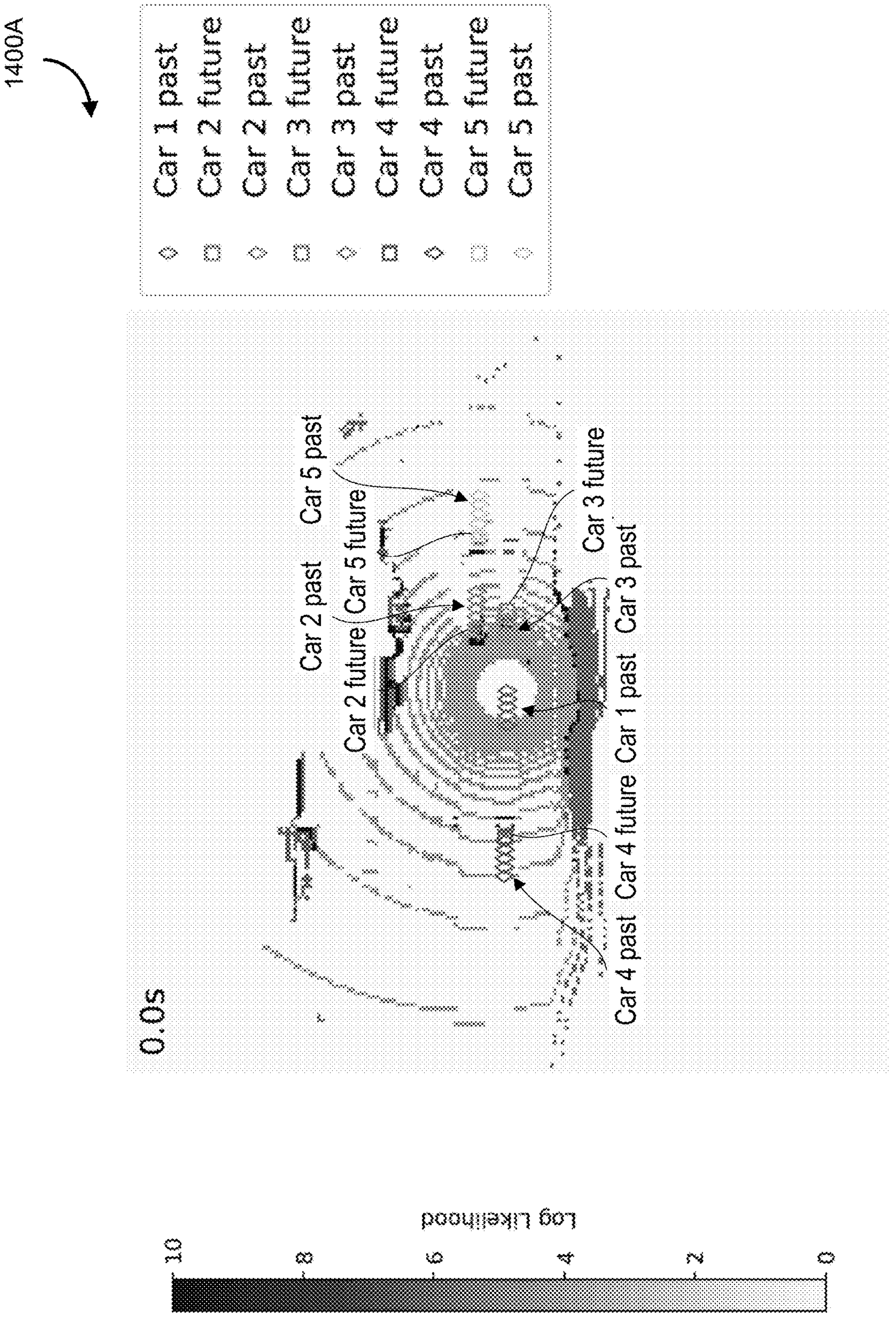
Figure 14B:
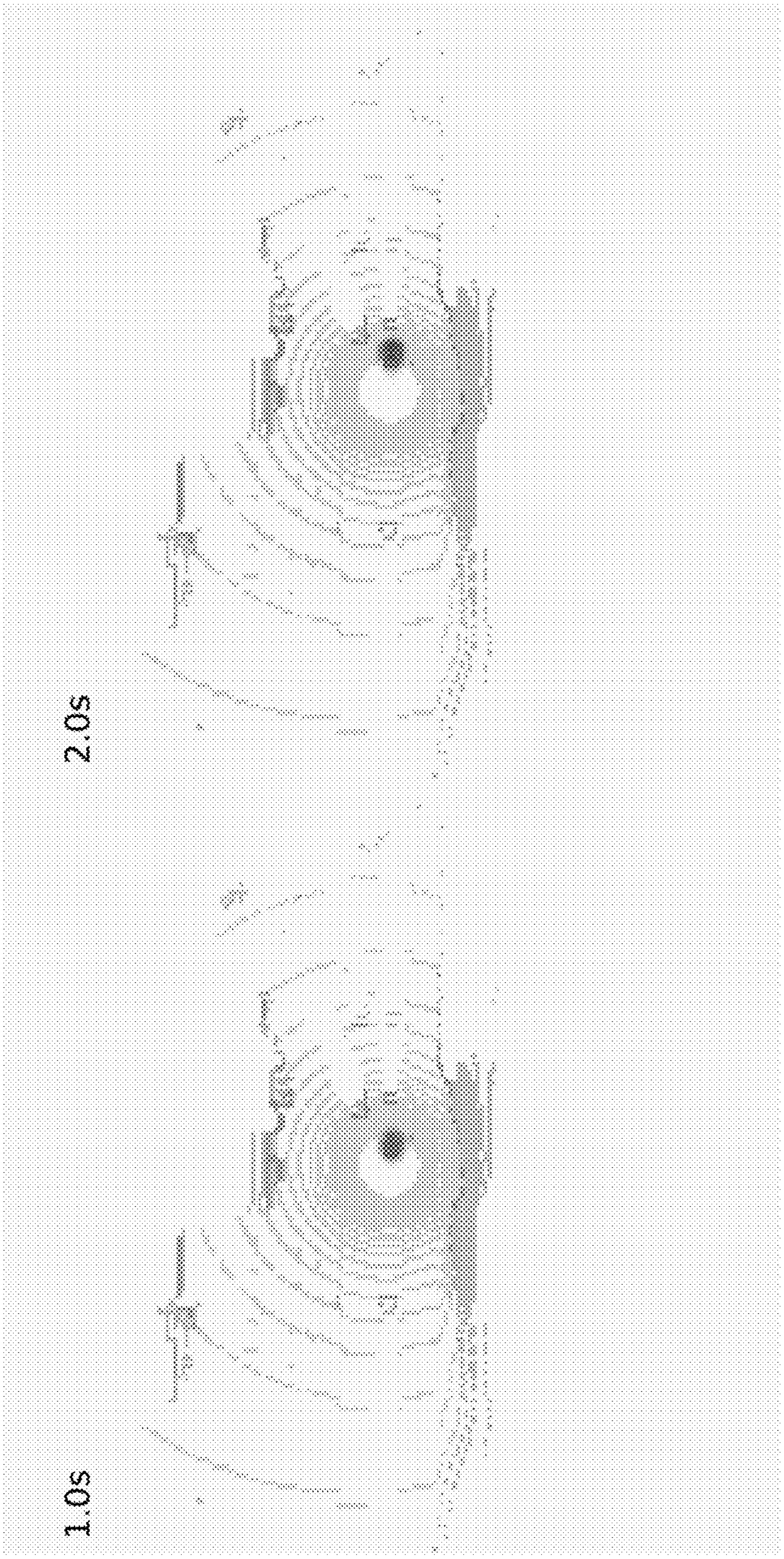
Figure 14C:
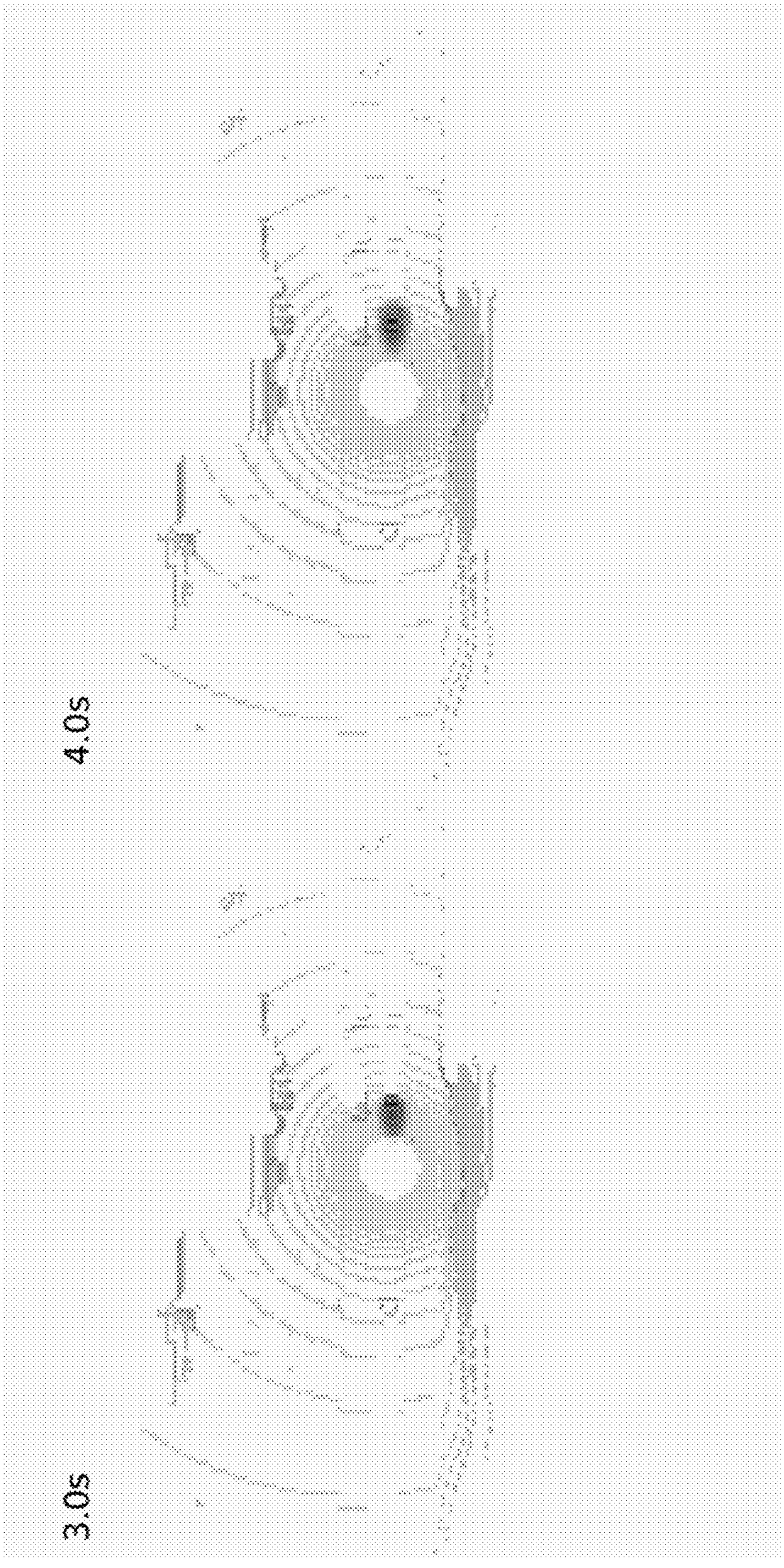

FIG. 12A, 12B, 12C, FIG. 13A, 13B, 13C and FIG. 14A, 14B, 14C each illustrate example Preco-Carla Predictions. Examples predict conditional marginal distributions for four of the twenty horizons in the Precog Carla Dataset, according to some embodiments. FIG. 12A, FIG. 13A and FIG. 14A show in graphs 1200A, 1300A and 1400A respectively, the full conditioning information available to the agent, specifically the autopilots historical trajectory, the historical trajectory of the four closest cars, and a lidar captured by the autopilot at t=0. A single future point for each agent is appended to the top plot to aid the reader when estimating the direction of those agents. Graphs 1200B, 1200C, 1300B, 1300C, and 1400B, 1400C show marginals at $t \in 1, 2, 3, 4 \cdot s$ into the future and the true future location of the autopilot at those times.

FIGS. 12A, 12B, 12C should be viewed together. FIG. 12A provides a visualization of the historical information (positions of car 1,2,3, etc.). FIG. 12B and FIG. 12C are the predicted probability map for the target car at different future steps. In FIG. 12A-12C, the computational representation conditioning information is shown in the background as visual artifacts—these are the computer generated visual outputs representing aspects such as street corners, street lights, etc., but the representation is different than what is observed from humans.

In FIGS. 12-14, the box represents a ground truth, and the cloud is a log-likelihood prediction. If, for example, the two are overlapping, which can be seen throughout graphs 1200B, 1200C, 1300B, 1300C, and 1400B, 1400C, then the model may be performing well.

It may be noted that the model's accuracy decreases over time, however the strong overlap still demonstrates good performance of the model.

Comments

A normalizing flow based architecture was presented with a structure motivated by the assumption of modelling a continuous temporal process. Experimental evidence suggested that the constraints that allow for the smooth interpolation of likelihood estimates did cause some degradation in performance, however capabilities are demonstrated within in comparison to other leading approaches for likelihood estimation on agent forecasting. Specifically the ability to conditionally model complex processes is demonstrated, and to both interpolate and extrapolate those results through time. Further, performance on the important and technically challenging task of agent forecasting is explored, and comparable performance to the state-of-the-art is achieved.

The described approach may be extended to the important task of multi-agent forecasting, where a normalizing flow formulation is expected to be particularly useful for capturing the complex high dimensional distributions. For example, if the conditional information includes the necessary surrounding agent information, the described systems and methods, in some embodiments, may be applied to single-agent and/or multi-agent forecasting.

Figure 15:
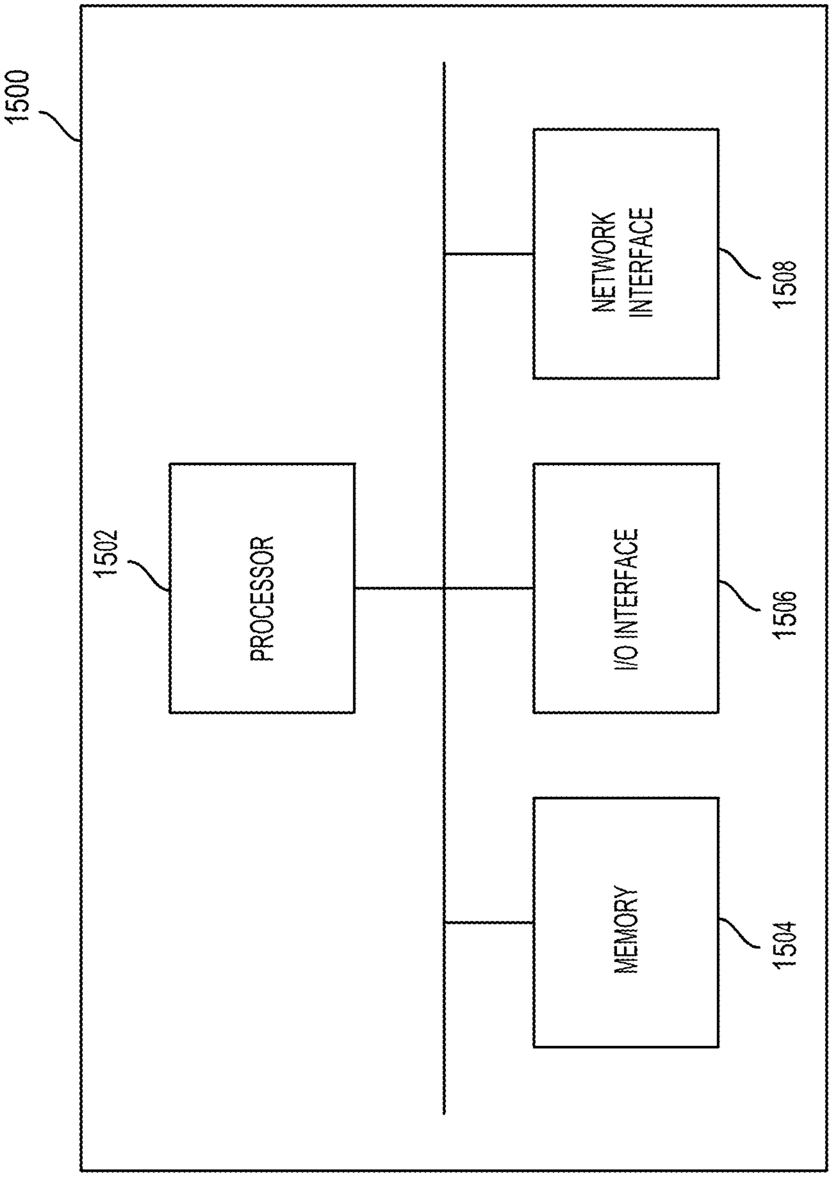
FIG. 15 is a schematic diagram of a computing device, exemplary of an embodiment.

FIG. 15 is a schematic diagram of computing device 1500, exemplary of an embodiment. As depicted, computing device 1500 includes at least one processor 1502, memory 1504, at least one I/O interface 1506, and at least one network interface 1508. The device 1500 can be configured to generate output data structures in accordance with the embodiments described herein.

Each processor 1502 may be, for example, a microprocessor or microcontroller, a digital signal processing (DSP) processor, an integrated circuit, a field programmable gate array (FPGA), a reconfigurable processor, a programmable read-only memory (PROM), or combinations thereof.

Memory 1504 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 1506 enables computing device 1500 to interconnect with one or more input devices, such as a keyboard, mouse, camera, touch screen and a microphone, or with one or more output devices such as a display screen and a speaker.

Each network interface 1508 enables computing device 1500 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including combinations of these.

Computing device 1500 is operable to register and authenticate users (using a login, unique identifier, and password for example) prior to providing access to applications, a local network, network resources, other networks and network security devices. Computing devices 1500 may serve one user or multiple users.

For simplicity only one computing device 1500 is shown but system may include more computing devices 1500 operable by users to access remote network resources 1500 and exchange data. The computing devices 1500 may be the same or different types of devices. The computing device 1500 at least one processor, a data storage device (including volatile memory or non-volatile memory or other data storage elements or a combination thereof), and at least one communication interface. The computing device components may be connected in various ways including directly coupled, indirectly coupled via a network, and distributed over a wide geographic area and connected via a network (which may be referred to as "cloud computing").

For example, and without limitation, the computing device may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods described herein.

FIG. 16 is a method diagram showing an example approach for generating agent position predictions at flexible prediction horizons, according to some embodiments.

In the method 1600 shown at FIG. 16, a series of steps are shown that can be used in relation to agent forecasting at flexible horizons using ODE Flows. The steps are shown as examples, and variations are possible with more, different, or less steps.

In this method, an approach is shown whereby a neural ODE network architecture is specifically adapted to embed an assumption that marginal distributions of a given agent moving forward in time are related.

At 1602, the neural ODE is initialized, and in some embodiments, the neural ODE has a set of initial parameters. These initial parameters, for example, can be maintained in a data structure and updated during an iterative training process whereby the parameters are updated to iteratively optimize (e.g., minimize) losses in accordance with a loss function.

At 1604, a set of positioning data sets or other available conditioning information is obtained through data set interrogation by requesting data from upstream data sources, or extraction from provided data sets. The positioning data sets can include prior agent positioning data, such as that of other agents, or various types of environmental data. Environmental data can include, for example, geometric/geospatial characteristics (e.g., positions of roadways, roadway signage, traffic light states), and may have multiple dimensions or features.

Positioning data can be represented, for example, as rows in a high dimensional matrix having fields corresponding to characteristics of the positioning data. The information, in some embodiments, is prepared for usage through an encoding step where an encoding neural network is utilized to first convert the raw conditioning information into a vector of conditioning information. Using the encoding steps helps facilitate asynchronous conditioning when predicting conditional marginal distributions. The vector of conditioning information can be concatenated to the input of the neural ODE network f.

In some embodiments, a time translation step is utilized to aid in mapping or translating from time t to a corresponding time representation in the ODE space. The time translation step can include a warm-up period that is introduced between the base distribution and the first evaluation point, having a length that is an additional parameter for optimization in training.

At 1606, the neural ODE is trained based on the observed positioning data and conditioning information at various times associated with the observations. Training variations are possible, for example, in a first variant embodiment, additional encoding information can be concatenated with the output of the ODE and an extra loss on extrapolating the predicted process in the future can be added. In another variation, a separate ODE flow transform can be established between each inference time point in training, yielding improved expressive power by removing a constraint that the representation be fully continuous in time (e.g., each separate ODE transform learns its own ODE stop time). In a further variation, no conditioning information can also be appended to the neural ODE. In 1606, different variations are possible, and a proposed approach is to optimize the mean negative log-likelihood of distributions at a number of different target horizons, with a specific optimization objective.

At 1608, time points for a desired analysis can be identified.

At 1610, the neural ODE is utilized to for first determining likelihood estimates at corresponding horizons of interest to determine corresponding points in the base distribution z0, In the determination, the initial value problem is solved to find the equivalent point in the base distribution, and determining likelihood estimates is conducted through solving the initial value problem for each different choice oft where the temporal axis of the ODE is aligned with the axis of time in the data set of interest.

At 1614, the trained neural ODE is available for inference, and while the model is trained on only a finite selection of time-steps, inference can be conducted at any future time steps, due to the continuous nature of the proposed framework.

For example, the desired time points can be interpolated time points (e.g., between observations), or extrapolated time points (e.g., before or after observations). The approach is adapted to control the model to generate realistic position estimates for the agent at the desired time, based on an assumption of modelling a continuous temporal process.

At inference, the system is configured to sample, from the base distribution to find $z^0$, and along with the conditional information, utilize the trained Neural ODE to solve for the time points of interest to generate output data structure.

As the approach uses sampling from the base distribution, the trained Neural ODE will transform it into a point prediction. If the system samples multiple times from the base distribution (covering all of the base distribution), the corresponding transformed point will form the predicted distribution. In short, the system is predicting distribution, and the system can efficiently sample from it. Accordingly, with different samples from the base distribution, the trained model can predict diverse future trajectories.

For example, considering the history and conditional information as a self-driving car approaching an intersection, possible future trajectories could be car moving forward, car turning left, car turning right, car stopping to give way to pedestrian, etc.

The density of such predictions will be decided by the trained neural ODE model, together with the conditional information, embedded with the car's surroundings.

In particular, the approach can include sampling from the base distribution, solving for a point with conditioning information and n ODE points of interest to find points on a corresponding trajectory. Each of the points on the corresponding trajectory can be converted into predictive outputs at the time points of interest and recorded into an output data structure.

At 1614, the output data structure is communicated by the system (e.g., made available through an API, pushed out, polled from, queried) to one or more downstream computing systems, which utilize the data structure to control downstream activities, generate visualizations or reports, or aggregate or combine the data structure for downstream processing.

Figure 17:
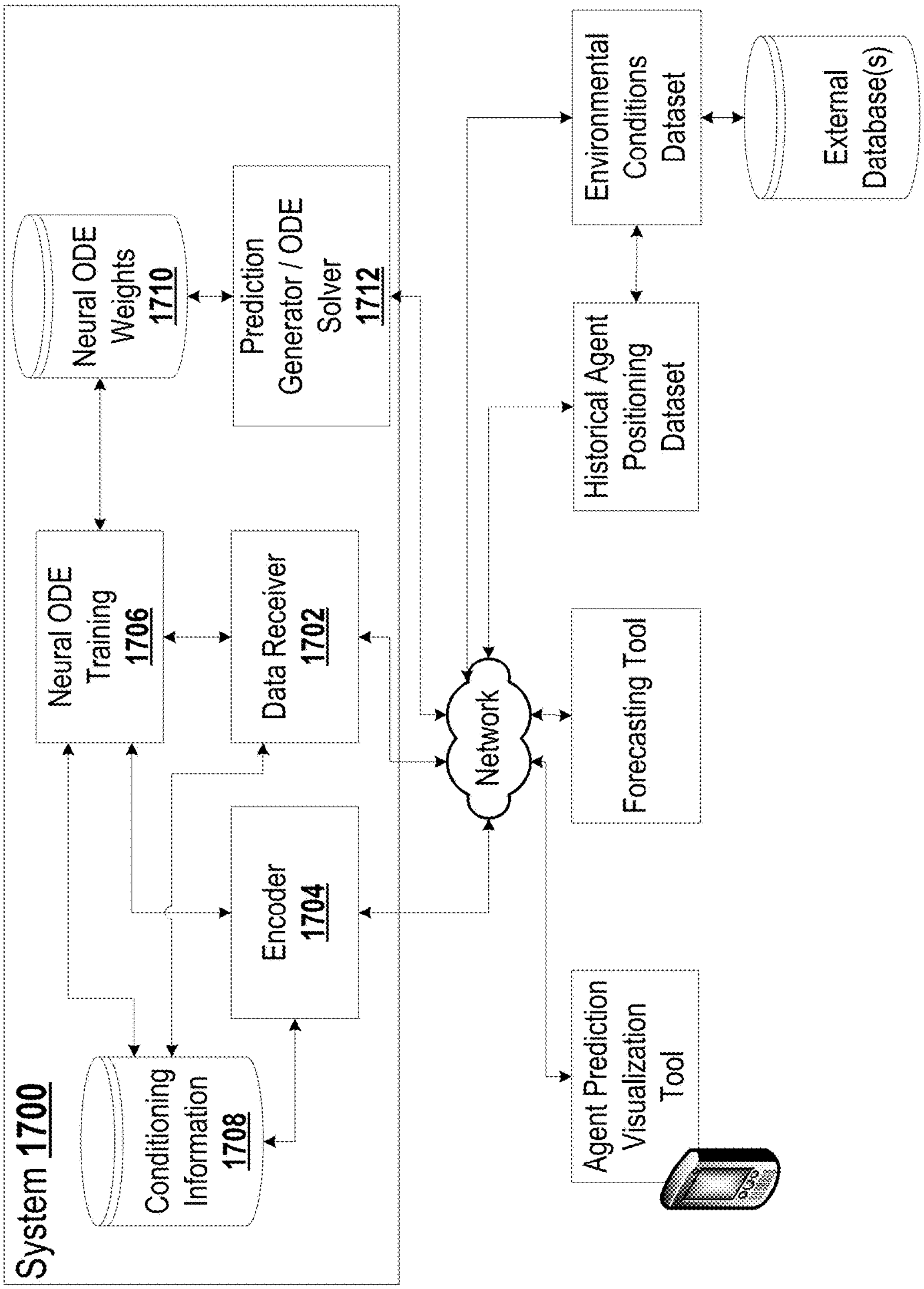
FIG. 17 is an example system for generating agent position predictions at flexible prediction horizons, according to some embodiments.

FIG. 17 is an example system for generating agent position predictions at flexible prediction horizons, according to some embodiments. The system 1700 can be configured to implement the method 1600, and the system 1700 can include an electronic or electrical circuit or a computing device, such as a server or a computer. Components of system 1700 can be implemented on corresponding hardware, software, firmware, or a combination thereof, and the system 1700 can be a physical computing apparatus or device having coupled processors, computing memory, logic gates, storage media, among others.

The system 1700 can be used in different applied usages. For example, in a first embodiment, system 1700 can be utilized in an application for predictive positioning of autonomous vehicle agents to improve autonomous driving and/or related control thereof. This is useful, for example, to enhance how autonomous vehicle predictions are used to change how the autonomous vehicle or other control objects (e.g., traffic lights) observe future or interpolated data based on observations, improving their accuracy in predicting positions of agents in the environment. For example, different models can be used for each different agent such that the system 1700 is able to generate predictions for each different agent, and the output data sets can be encapsulated in the form of occupancy maps, indicative of marginal distributions at specific points in time for various positions (e.g., two-dimensional positions, such as GPS coordinates).

Where there are multiple agents being considered together, their occupancy maps can be used for traffic forecasting, among others, and furthermore, variations in different environmental factors encapsulated as conditioning information can be implemented to test different permutations and combinations of control aspects to model their impact on the occupancy maps given a particular change. In the autonomous vehicle example, conditioning information can be obtained from real-world sensors, such as traffic control information, LIDAR information, cameras, etc., and these are utilized as inputs into the neural ODE for training or during inference time for prediction generation.

In FIG. 17, a data receiver 1702 is provided that can include an application programming interface (API) that can receive one or more data sets as training inputs and/or conditioning information. The data receiver 1702 can be a software interface that can receive data sets in real-time, or extract data sets from source databases, among others. Information can be obtained from corresponding APIs for other devices, or directly obtained from sensors, LIDAR, GPS sensors, among others. The data receiver 1702 can provide this information to the encoder 1704, which in some embodiments, may be a separate neural network or machine learning architecture that is configured to transform the position information and/or the conditioning information together to generate a vector of conditioning information that can be provided as an input into the neural ODE.

A neural ODE training engine 1706 is provided that is a computational mechanism, such as a software program, that interacts with a neural ODE architecture represented, for example, in a set of stored neural ODE weights 1710 representing various neural ODE parameters. The neural ODE weights 1710 are updated during the training process, for example, to optimize a loss function.

During inference for a set of desired points for analysis, a prediction generator/ODE solver engine 1712 interoperate with the trained neural ODE to generate predictive outputs. The predictive outputs from 1712 are based at least on the predictions generated by running the trained neural ODE on inference mode. For example, a useful predictive output includes a data set of locations paired with a predictive probability score (e.g., location x, y, z; p=0.7 at t=25 s) that the agent will be in that position at a particular time point either interpolated or extrapolated (e.g., in the future). This data set can then be used to establish an occupancy map if multiple agents are interacting with one another.

The trained neural ODE can be run at inference time with different types of conditioning data or different variations so that impacts on positions can be estimated. For example, the conditioning data to be analyzed could include whether a traffic light is switched early or not, or whether a road closure is instituted, and the predictive outputs can be used to establish whether the road should be closed, whether the occupancy map would be positively impacted by an early traffic light switch, among others. The occupancy map can also be used for load planning, for example, indicating potential areas or points of expected busy-ness (e.g., people existing an opera house after a particularly popular opera singer performs). At these points, for example, an increased amount of police traffic management or crowd management personnel can be pre-emptively deployed to help ensure the orderly and safe movement of individuals.

Figure 18:
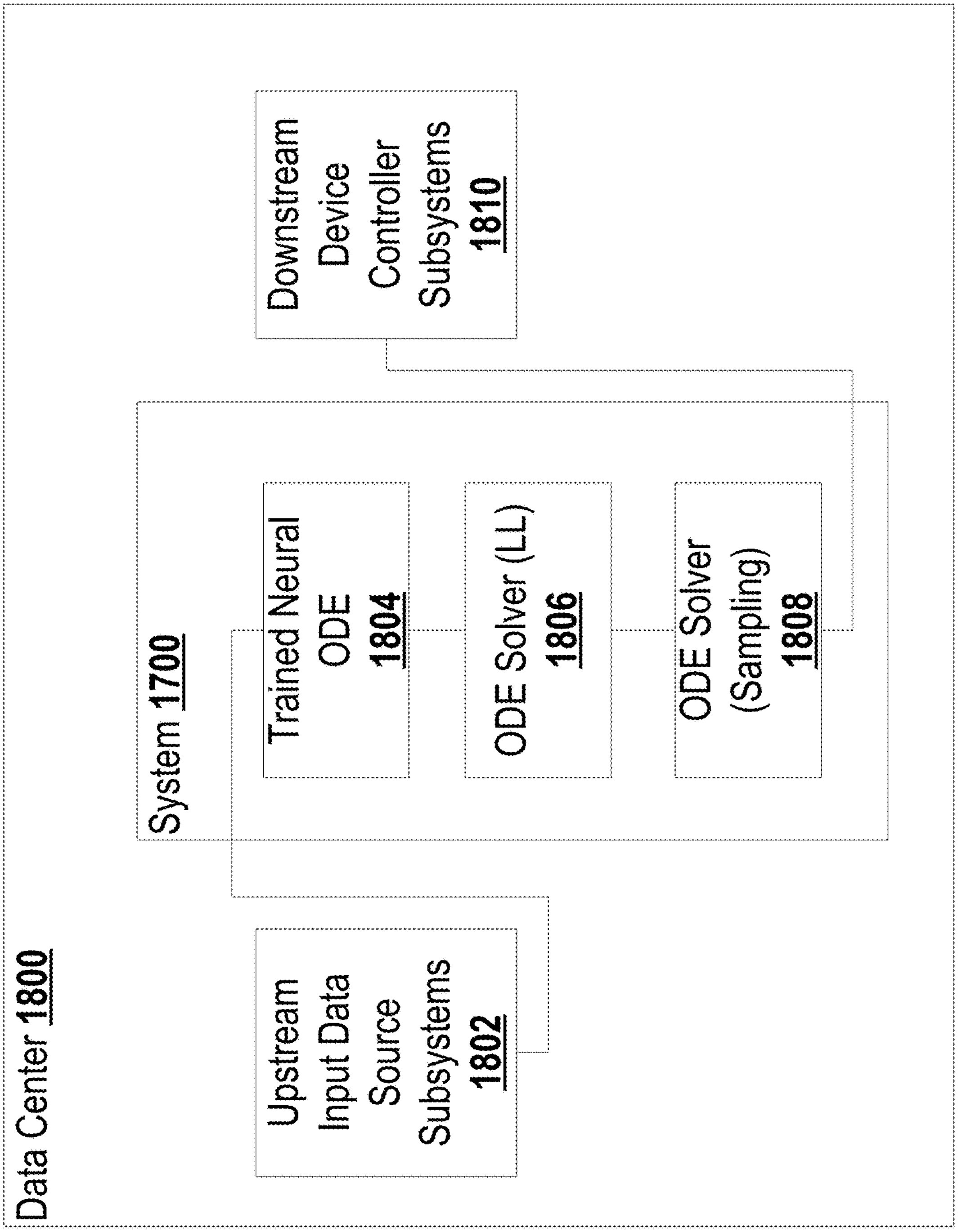
FIG. 18 is a representation of the system operating in a data center, according to some embodiments.

FIG. 18 is a representation of the system operating in a data center, according to some embodiments. In FIG. 18, a data center 1800 is provided that could, for example, be a facility or a premises where there are multiple computing devices and servers operating in concert with one another. An example data center 1800 could include a vehicle control or traffic control center that handles traffic operations and/or dispatches. Data is provided by source subsystems 1802 to system 1700 representative of various observations at different times, including both agent positioning data and/or conditional information, and these can be obtained from coupled sensors or historical data. The data is used to train and/or update the trained neural ODE 1804, and when inference is required, the system 1700 utilizes an ODE solver 1806 in respect of generating log-likelihood information, and then ODE solver 1808 in respect of generating sampling information to arrive at the predictive outputs.

At 1810, the predictive outputs are provided to downstream device controller subsystems 1810, for example, in the form of raw data, completed occupancy maps, predictive tuples, etc., which then utilize the predictive outputs for controlling operation of downstream devices, such as changing traffic control patterns if a high amount of traffic occupancy is expected, or dispatching more resources, among others.

REFERENCES

[1] Sorin Grigorescu, Bogdan Trasnea, Tiberiu Cocias, and Gigel Macesanu. A survey of deep learning techniques for autonomous driving. *Journal of Field Robotics,* 37, 11 2019. doi: 10.1002/rob.21918.

[2] Álvaro Arcos-Garcia, Juan A Alvarez-Garcia, and Luis M Soria-Morillo. Deep neural network for traffic sign recognition systems: An analysis of spatial transformers and stochastic optimisation methods. *Neural Networks,* 99:158-165, 2018.

[3] Shichao Zhou, Chenwei Deng, Zhengquan Piao, and Baojun Zhao. Few-shot traffic sign recognition with clustering inductive bias and random neural network. Pattern Recognition, 218 100:107160, 2020.

[4] Wei Liu, Shengcai Liao, Weiqiang Ren, Weidong Hu, and Yinan Yu. High-level semantic feature detection: A new perspective for pedestrian detection. In *Proceedings of the IEEE/CVF Conference on Computer Vision and Pattern Recognition*, pages 5187-5196, 2019.

[5] Jiayuan Mao, Tete Xiao, Yuning Jiang, and Zhimin Cao. What can help pedestrian detection? In *Proceedings of the IEEE Conference on Computer Vision and Pattern Recognition*, pages 3127-3136, 2017.

[6] Zhong-Qiu Zhao, Peng Zheng, Shou tao Xu, and Xindong Wu. Object detection with deep learning: A review, 2019.

[7] Sajjad Mozaffari, Omar Y. Al-Jarrah, Mehrdad Dianati, Paul A. Jennings, and Alexandros Mouzakitis. Deep learning-based vehicle behaviour prediction for autonomous driving applications: A review. *CoRR*, abs/1912.11676, 2019.

[8] Andrey Rudenko, Luigi Palmieri, Michael Herman, Kris M Kitani, Dariu M Gavrila, and Kai O Arras. Human motion trajectory prediction: a survey. *The International Journal of Robotics Research,* 39(8):895-935, June 2020. ISSN 1741-3176. doi: 10.1177/0278364920917446.

[9] P. Whittle. *Hypothesis Testing in Time Series Analysis*. Statistics/Uppsala universitet. Almqvist & Wiksells boktr., 1951. ISBN 9780598919823.

[10] David Salinas, Valentin Flunkert, and Jan Gasthaus. Deepar: Probabilistic forecasting with autoregressive recurrent networks, 2019.

[11] Yichuan Tang and Ruslan Salakhutdinov. Multiple futures prediction. In *NeurIPS,* 2019.

[12] Nicholas Rhinehart, Rowan McAllister, Kris M. Kitani, and Sergey Levine. PRECOG: prediction conditioned on goals in visual multi-agent settings. *CoRR*, abs/1905.01296, 2019.

[13] Yecheng Jason Ma, Jeevana Priya Inala, Dinesh Jayaraman, and Osbert Bastani. Diverse sampling for normalizing flow based trajectory forecasting, 2020.

[14] Maciej Zieba, Marcin Przewiezlikowski, Marek Smieja, Jacek Tabor, Tomasz Trzcinski, and Przemyslaw Spurek. Regflow: Probabilistic flow-based regression for future prediction, 2020.

[15] Osama Makansi, Eddy Ilg, Özgun Çiçek, and Thomas Brox. Overcoming limitations of mixture density networks: A sampling and fitting framework for multimodal future prediction. *CoRR*, abs/1906.03631, 2019.

[16] Nicholas Rhinehart, Kris Kitani, and Paul Vernaza. R2p2: A reparameterized pushforward policy for diverse, precise generative path forecasting. In *European Conference on Computer Vision*. Springer, 2018.

[17] Geunseob Oh and Jean-Sebastien Valois. HCNAF: hyper-conditioned neural autoregressive flow and its application for probabilistic occupancy map forecasting. *CoRR*, abs/1912.08111, 2019.

[18] Ruizhi Deng, Bo Chang, Marcus A. Brubaker, Greg Mori, and Andreas Lehrmann. Modeling continuous stochastic processes with dynamic normalizing flows, 2020.

[19] Ricky T. Q. Chen, Yulia Rubanova, Jesse Bettencourt, and David Duvenaud. Neural ordinary differential equations, 2018.

[20] Yulia Rubanova, Ricky T. Q. Chen, and David Duvenaud. Latent odes for irregularly-sampled time series. *CoRR*, abs/1907.03907, 2019 .

[21] Edward De Brouwer, Jaak Simm, Adam Arany, and Yves Moreau. Gru-ode-bayes: Continuous modeling of sporadically-observed time series. *CoRR*, abs/1905.12374, 2019.

[22] Aaron Voelker, Ivana Kajic', and Chris Eliasmith. Legendre memory units: Continuous-time representation in recurrent neural networks. In H. Wallach, H. Larochelle, A. Beygelzimer, F. d'Alché-Buc, E. Fox, and R. Garnett, editors, *Advances in Neural Information Processing Systems*, volume 32, pages 15570-15579. Curran Associates, Inc., 2019.

[23] Yang Li, Haidong Yi, Christopher M. Bender, Siyuan Shan, and Junier B. Oliva. Exchangeable neural ode for set modeling, 2020.

[24] Davis Rempe, Tolga Birdal, Yongheng Zhao, Zan Gojcic, Srinath Sridhar, and Leonidas J. Guibas. Caspr: Learning canonical spatiotemporal point cloud representations, 2020.

[25] Alexander Tong, Jessie Huang, Guy Wolf, David van Dijk, and Smita Krishnaswamy. Trajectorynet: A dynamic optimal transport network for modeling cellular dynamics, 2020.

[26] Ricky T. Q. Chen, Brandon Amos, and Maximilian Nickel. Neural spatio-temporal point processes, 2021.

[27] Chen Qiu, Stephan Mandt, and Maja Rudolph. Variational dynamic mixtures, 2020.

[28] Manoj Kumar, Mohammad Babaeizadeh, Dumitru Erhan, Chelsea Finn, Sergey Levine, Laurent Dinh, and Durk Kingma. Videoflow: A flow-based generative model for video. *CoRR*, abs/1903.01434, 2019.

[29] Oleksandr Shchur, Marin Bilos, and Stephan Günnemann. Intensity-free learning of temporal point processes. *CoRR*, abs/1909.12127, 2019.

[30] Nazanin Mehrasa, Ruizhi Deng, Mohamed Osama Ahmed, Bo Chang, Jiawei He, Thibaut Durand, Marcus Brubaker, and Greg Mori. Point process flows. *CoRR*, abs/1910.08281, 2019.

[31] Apratim Bhattacharyya, Michael Hanselmann, Mario Fritz, Bernt Schiele, and Christoph-Nikolas Straehle. Conditional flow variational autoencoders for structured sequence prediction. *CoRR*, abs/1908.09008, 2019.

[32] Kashif Rasul, Abdul-Saboor Sheikh, Ingmar Schuster, Urs Bergmann, and Roland Vollgraf. Multivariate probabilistic time series forecasting via conditioned normalizing flows, 2021.

[33] Javad Amirian, Jean-Bernard Hayet, and Julien Pettre. Social ways: Learning multi-modal distributions of pedestrian trajectories with gans. *CoRR*, abs/1904.09507, 2019.

[34] Ajay Jain, Sergio Casas, Renjie Liao, Yuwen Xiong, Song Feng, Sean Segal, and Raquel Urtasun. Discrete residual flow for probabilistic pedestrian behavior prediction. *CoRR*, abs/1910.08041, 2019.

[35] Chin-Wei Huang, David Krueger, Alexandre Lacoste, and Aaron Courville. Neural autoregressive flows, *CoRR*, abs/1804.00779, 2018.

[36] George Papamakarios, Eric Nalisnick, Danilo Jimenez Rezende, Shakir Mohamed, and Balaji Lakshminarayanan. Normalizing flows for probabilistic modeling and inference, 2019.

[37] Ivan Kobyzev, Simon Prince, and Marcus Brubaker. Normalizing flows: An introduction and review of current methods. *IEEE Transactions on Pattern Analysis and Machine Intelligence*, page 1-1, 2020. ISSN 1939-3539. doi: 10.1109/tpami.2020.2992934.

[38] Danilo Jimenez Rezende and Shakir Mohamed. Variational inference with normalizing flows, 2016.

[39] Will Grathwohl, Ricky T. Q. Chen, Jesse Bettencourt, Ilya Sutskever, and David Duvenaud. Ffjord: Free-form continuous dynamics for scalable reversible generative models. *ArXiv*, abs/1810.01367, 2018.

[40] Shweta Mahajan, Apratim Bhattacharyya, Mario Fritz, Bernt Schiele, and Stefan Roth. Normalizing flows with multi-scale autoregressive priors, 2020.

[41] Priyank Jaini, Ivan Kobyzev, Yaoliang Yu, and Marcus Brubaker. Tails of lipschitz triangular flows, 2020.

[42] Chris Finlay, Jörn-Henrik Jacobsen, Levon Nurbekyan, and Adam M Oberman. How to train your neural ode: the world of jacobian and kinetic regularization, 2020.

[43] Dosovitskiy, A., Ros, G., Codevilla, F., López, A. M., and Koltun, V. CARLA: an open urban driving simulator. *CoRR*, abs/1711.03938, 2017.

[44] Kingma, D. P., Salimans, T., and Welling, M. Improving variational inference with inverse autoregressive flow. *CoRR*, abs/1606.04934, 2016.

Closing Remarks

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references were made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The foregoing discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein without departing from the scope described herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the embodiments are intended to include within their scope such processes, machines, manufacture, compositions of matter, means, methods, or steps As can be understood, the examples described above and illustrated are intended to be exemplary only.

What is claimed is:

1. A machine learning system for generating agent position predictions at flexible prediction horizons, the machine learning system comprising:

a computer processor coupled with computer memory and a non-transitory computer readable storage medium, the computer processor configured to:

initialize, on the non-transitory computer readable storage medium, a fully connected neural network machine learning model architecture f adapted for neural ordinary differential equation (neural ODE) representation defined by a neural ODE transform $$\frac{\partial z(t)}{\partial t},$$

the neural DE transform $$\frac{\partial z(t)}{\partial t}$$

defining a temporally continuous normalizing flow that transforms a base distribution into a predicted probability distribution of agent positions such that for parameters θ and a vector of conditioning information $$\phi,\ f(z(t), t, \phi; \theta) = \frac{\partial z(t)}{\partial t};$$

where z is an observation at time t, and $$\frac{\partial z(t)}{\partial t}$$

represents an instantaneous rate of change in z with respect to t;

receive one or more positional data sets representative of positional data of an agent, each data set corresponding to a discrete asynchronous point in time of a set of asynchronous times $t_j t'_i \in T'$;

receive one or more conditioning information data sets ϕ representative of environmental data, the one or more conditioning information data sets $\phi$ concatenated to the input of every fully connected layer described by the neural ODE transform;

train the fully connected neural network machine learning model architecture f using the one or more positional data sets and the one or more conditioning information data sets to minimize a mean negative log-likelihood of distributions at |T| target horizons; and generate, using the trained neural ODE machine learning model architecture f for a target time t, an output data set representing an agent position estimate at the target time t, the output data set comprising predicted marginal distributions at arbitrary target times including times not present in the one or more positional data sets or the one or more conditioning information data sets.

2. The machine learning system of claim 1, wherein the agent position predictions are based on marginal distributions $(\{x_{(t_i)}\}_i$ with $T \ni t_i > \max(T')$, where x is the positional data sets representative of positional data of an agent, T is a set of target horizons, T' is a set of discrete past observation times, and $t_i$ is a future prediction time; and wherein the fully connected neural network machine learning model architecture f is configured to model a marginal probability distribution of agent positions $p_t(x(t)|\phi)$ for a range of values of $t>t_0$, such that, $p_t(x(t))$ is an informative base distribution of $p_{t+\epsilon}(x(t+\epsilon))$, where $\epsilon$ is an increment in time.

3. The machine learning system of claim 2, wherein the fully connected neural network machine learning model architecture f has a property whereby distributions of $p_t(x(t)|\phi)$ and $p_{t+\epsilon}(x(t+\epsilon)|\phi)$ are identical when $\epsilon$ approaches 0.

4. The machine learning system of claim 3, wherein the fully connected neural network machine learning model architecture f is configured such that at a target time in the future, target distribution $p_{t+\epsilon}(x(t+\epsilon))$ is transformed by f forward in time from the previous time-step $p_t(x(t))$.

5. The machine learning system of claim 4, wherein the target distribution $p_{t+\epsilon}(x(t+\epsilon))$ satisfies the relation:

$$p_{t+\epsilon}(x(t+\epsilon)) = p_t\left(f^{-1}(x(t+\epsilon))\right)\left|\det\frac{\partial f^{-1}}{\partial x(t+\epsilon)}\right|.$$

where $f^{-1}$ denotes an inverse of the neural ODE transform, and det denotes a determinant operation.

6. The machine learning system of claim 1, wherein the vector $\phi$ is provided to the fully connected neural network machine learning model architecture f by an encoder model architecture.

7. The machine learning system of claim 1, wherein the minimizing of the mean negative log-likelihood of distributions at |T| target horizons uses a loss function having the relation:

$$\mathcal{L}_{NLL} = -\sum_{i=0}^{|T|}\log\left(p_{t_i}\left(x_{(t_i)} \mid \phi, t_i, \theta\right)\right),$$

where p is a marginal probability distribution of agent positions, x is the positional data sets representative of positional data of an agent, and $t_i$ is a future prediction time.

8. The machine learning system of claim 1, wherein the output data set is generated through solving an initial value problem where a temporal axis of the neural ODE architecture is aligned with an axis of time in the one or more positional data sets or the one or more conditioning information data sets.

9. The machine learning system of claim 1, wherein the agent is a vehicle with a position detector, and the one or more positional data sets correspond to two or three dimensional positioning of the vehicle as measured by the position detector, the position detector comprising at least one of: LIDAR sensor, camera, and GPS receiver.

10. The machine learning system of claim 1, wherein the machine learning system resides in a data center as a physical computing server and is coupled to a message bus to downstream and upstream computing devices.

11. A machine learning method for generating agent position predictions at flexible prediction horizons, the machine learning method comprising:

initializing, on a non-transitory computer readable storage medium, a fully connected neural network machine learning model architecture f adapted for neural ordinary differential equation (neural ODE) representation defined by a neural ODE transform $$\frac{\partial z(t)}{\partial t},$$

the neural ODE transform $$\frac{\partial z(t)}{\partial t}$$

defining a temporally continuous normalizing flow that transforms a base distribution into a predicted probability distribution of agent positions such that for parameters $\theta$ and a vector of conditioning information $$\phi,\ f(z(t), t, \phi; \theta) = \frac{\partial z(t)}{\partial t};$$

where z is an observation at time t, and $$\frac{\partial z(t)}{\partial t}$$

represents an instantaneous rate of change in z with respect to t;

receiving one or more positional data sets representative of positional data of an agent, each data set corresponding to a discrete asynchronous point in time of a set of asynchronous times $t_j t'_i \in T'$;

receiving one or more conditioning information data sets $\phi$ representative of environmental data, the one or more conditioning information data sets $\phi$ concatenated to the input of every fully connected layer described by the neural ODE transform;

training the fully connected neural network machine learning model architecture f using the one or more positional data sets and the one or more conditioning information data sets to minimize a mean negative log-likelihood of distributions at |T| target horizons; and generating, using the trained neural ODE machine learning model architecture f for a target time t, an output data set representing an agent position estimate at the target time t, the output data set comprising predicted marginal distributions at arbitrary target times including times not present in the one or more positional data sets or the one or more conditioning information data sets.

12. The machine learning method of claim 11, wherein the agent position predictions are based on marginal distributions $(\{x_{(t_i)}\}_i$ with $T \ni t_i > \max(T')$, where x is the positional data sets representative of positional data of an agent, T is a set of target horizons, T' is a set of discrete past observation times, and $t_i$ is a future prediction time; and wherein the fully connected neural network machine learning model architecture f is configured to model a marginal probability distribution of agent positions $p_t(x(t)|\phi)$ for a range of values of $t>t_0$, such that, $p_t(x(t))$ is an informative base distribution of $p_{t+\epsilon}(x(t+\epsilon))$, where $\epsilon$ is an increment in time.

13. The machine learning method of claim 12, wherein the fully connected neural network machine learning model architecture f has a property whereby distributions of $p_t(x(t)|\phi)$ and $p_{t+\epsilon}(x(t+\epsilon)|\phi)$ are identical when $\epsilon$ approaches 0.

14. The machine learning method of claim 13, wherein the fully connected neural network machine learning model architecture f is configured such that at a target time in the future, target distribution $p_{t+\epsilon}(x(t+\epsilon))$ is transformed by f forward in time from the previous time-step $p_t(x(t))$.

15. The machine learning method of claim 14, wherein the target distribution $p_{t+\epsilon}(x(t+\epsilon))$ satisfies the relation:

$$p_{t+\epsilon}(x(t+\epsilon)) = p_t\left(f^{-1}(x(t+\epsilon))\right)\left|\det\frac{\partial f^{-1}}{\partial x(t+\epsilon)}\right|.$$

where $f^{-1}$ denotes an inverse of the neural ODE transform, and det denotes a determinant operation.

16. The machine learning method of claim 11, wherein the vector $\phi$ is provided to the fully connected neural network machine learning model architecture f by an encoder model architecture.

17. The machine learning method of claim 11, wherein the minimizing of the mean negative log-likelihood of distributions at |T| target horizons uses a loss function having the relation:

$$\mathcal{L}_{NLL} = -\sum_{i=0}^{|T|}\log\left(p_{t_i}\left(x_{(t_i)} \mid \phi, t_i, \theta\right)\right),$$

where p is a marginal probability distribution of agent positions, x is the positional data sets representative of positional data of an agent, and $t_i$ is a future prediction time.

18. The machine learning method of claim 11, wherein the output data set is generated through solving an initial value problem where a temporal axis of the neural ODE architecture is aligned with an axis of time in the one or more positional data sets or the one or more conditioning information data sets.

19. The machine learning method of claim 11, wherein the agent is a vehicle with a position detector, and the one or more positional data sets correspond to two or three dimensional positioning of the vehicle as measured by the position detector, the position detector comprising at least one of LIDAR sensor, camera, and GPS receiver.

20. A non-transitory computer readable medium storing computer interpretable instruction sets, which when executed by a computer processor, cause the computer processor to perform a machine learning method for generating agent position predictions at flexible prediction horizons, the machine learning method comprising:

initializing, on a non-transitory computer readable storage medium, a fully connected neural network machine learning model architecture f adapted for neural ordinary differential equation (neural ODE) representation defined by a neural ODE transform $$\frac{\partial z(t)}{\partial t},$$

the neural ODE transform $$\frac{\partial z(t)}{\partial t}$$

defining a temporally continuous normalizing flow that transforms a base distribution into a predicted probability distribution of agent positions such that for parameters $\theta$ and a vector of conditioning information $$\phi,\ f(z(t), t, \phi; \theta) = \frac{\partial z(t)}{\partial t};$$

where z is an observation at time t, and $$\frac{\partial z(t)}{\partial t}$$

represents an instantaneous rate of change in z with respect to t;

receiving one or more positional data sets representative of positional data of an agent, each data set corresponding to a discrete asynchronous point in time of a set of asynchronous times $t_j t'_i \in T'$;

receiving one or more conditioning information data sets $\phi$ representative of environmental data, the one or more conditioning information data sets $\phi$ concatenated to the input of every fully connected layer described by the neural ODE transform;

training the fully connected neural network machine learning model architecture f using the one or more positional data sets and the one or more conditioning information data sets to minimize a mean negative log-likelihood of distributions at |T| target horizons; and generating, using the trained neural ODE machine learning model architecture f for a target time t, an output data set representing an agent position estimate at the target time t, the output data set comprising predicted marginal distributions at arbitrary target times including times not present in the one or more positional data sets or the one or more conditioning information data sets.

* * * * *